US008027287B2

(12) United States Patent
Yun et al.

(10) Patent No.: US 8,027,287 B2
(45) Date of Patent: Sep. 27, 2011

(54) APPARATUS AND METHOD FOR GATING TRANSMISSION OF A DATA RATE CONTROL CHANNEL IN AN HDR MOBILE COMMUNICATION SYSTEM

(75) Inventors: Yu-Suk Yun, Seoul (KR); Soon-Young Yoon, Seoul (KR); Hee-Won Kang, Songnam-shi (KR); Jae-Heung Yeom, Seoul (KR); Sang-Hyun Yang, Seoul (KR); Hoon Han, Daejeon-Kwangyok-shi (KR)

(73) Assignee: Samsung Electronics Co., Ltd (KR)

( * ) Notice: Subject to any disclaimer, the term of this patent is extended or adjusted under 35 U.S.C. 154(b) by 1700 days.

(21) Appl. No.: 11/054,463

(22) Filed: Feb. 9, 2005

(65) Prior Publication Data

US 2005/0169295 A1    Aug. 4, 2005

Related U.S. Application Data

(62) Division of application No. 09/886,309, filed on Jun. 21, 2001, now Pat. No. 7,065,060.

(30) Foreign Application Priority Data

| Jun. 21, 2000 | (KR) | 2000-34335 |
| Jun. 27, 2000 | (KR) | 2000-37457 |
| Jul. 4, 2000 | (KR) | 2000-38084 |
| Jul. 27, 2000 | (KR) | 2000-45394 |

(51) Int. Cl.
*G01R 31/08* (2006.01)
*H04B 7/185* (2006.01)
*H04B 7/204* (2006.01)
*H04J 3/08* (2006.01)
*H04W 4/00* (2009.01)

(52) U.S. Cl. ........ 370/317; 370/238; 370/318; 370/319; 370/326; 370/329

(58) Field of Classification Search .................. 370/208, 370/209, 318, 329, 333, 437, 320, 321, 441, 370/442
See application file for complete search history.

(56) References Cited

U.S. PATENT DOCUMENTS 5,477,550 A * 12/1995 Crisler et al. ................. 714/748
(Continued)

FOREIGN PATENT DOCUMENTS

KR    1020000011799    2/2000
(Continued)

OTHER PUBLICATIONS

Casio et al., Proposed CDMA2000 Companion High Data Rate (HDR) Standard, Mar. 27, 2000.
(Continued)

*Primary Examiner* — Daniel J Ryman
*Assistant Examiner* — Thinh D Tran
(74) *Attorney, Agent, or Firm* — The Farrell Law Firm, P.C.

(57) ABSTRACT

A communication method in a mobile communication system in which an access terminal transmits to an access network DRC information indicating a selected one of forward data rates requested by the access terminal is provided. The access network designates a DRC information length DRCLength indicating a number of slots where the DRC information is repeated and transmits the designated DRC information length to the access terminal. The access terminal gates transmission of DRC information to the access terminal at one time slot in every DRC information length received from the access network.

18 Claims, 29 Drawing Sheets

U.S. PATENT DOCUMENTS

| | | | |
|---|---|---|---|
| 5,793,744 A | | 8/1998 | Kanerva et al. |
| 5,793,802 A | | 8/1998 | Kanada et al. |
| 5,818,820 A | * | 10/1998 | Anderson et al. ............. 370/280 |
| 5,963,548 A | * | 10/1999 | Virtanen ........................ 370/335 |
| 6,144,653 A | * | 11/2000 | Persson et al. ................ 370/337 |
| 6,205,129 B1 | * | 3/2001 | Esteves et al. ................ 370/331 |
| 6,373,823 B1 | | 4/2002 | Chen et al. |
| 6,480,481 B1 | | 11/2002 | Park et al. |
| 6,496,706 B1 | * | 12/2002 | Jou et al. ....................... 455/522 |
| 6,545,989 B1 | | 4/2003 | Butler |
| 6,574,211 B2 | * | 6/2003 | Padovani et al. .............. 370/347 |
| 6,728,233 B1 | | 4/2004 | Park et al. |
| 6,782,271 B2 | | 8/2004 | Huh et al. |
| 6,891,812 B2 | | 5/2005 | Bender |
| 6,901,254 B2 | | 5/2005 | Ahn |
| 7,110,466 B1 | * | 9/2006 | Gopalakrishnan et al. ... 375/295 |
| 2002/0012385 A1 | | 1/2002 | Yun et al. |
| 2002/0018446 A1 | | 2/2002 | Huh et al. |
| 2002/0021692 A1 | | 2/2002 | Huh et al. |

FOREIGN PATENT DOCUMENTS

| | | |
|---|---|---|
| KR | 1020000012047 | 2/2000 |
| WO | WO 96/27960 | 9/1996 |
| WO | WO 99/55112 | 10/1999 |
| WO | WO 00/07377 | 2/2000 |
| WO | WO 00/35126 | 6/2000 |

OTHER PUBLICATIONS

Younsun Kim et al., Slotted Mode for DRC Transmission, Jul. 2000.

* cited by examiner

APPARATUS AND METHOD FOR GATING TRANSMISSION OF A DATA RATE CONTROL CHANNEL IN AN HDR MOBILE COMMUNICATION SYSTEM

PRIORITY

This application is a Divisional of U.S. application Ser. No. 09/886,309, filed on Jun. 21, 2001 now U.S. Pat. No. 7,065,060, which claims priority to an application entitled claims priority to an application entitled "Apparatus and Method for Gating Transmitting Data Rate Control Channel in an HDR Mobile Communication System" filed in the Korean Industrial Property Office on Jun. 21, 2000 and assigned Serial No. 2000-34335, an application entitled "Apparatus and Method for Gating Data Rate Control Channel in an HDR Mobile Communication System" filed in the Korean Industrial Property Office on Jun. 27, 2000 and assigned Serial No. 2000-37457, an application entitled "Apparatus and Method for Gating Data Rate Control Channel in an HDR Mobile Communication System" filed in the Korean Industrial Property Office on Jul. 4, 2000 and assigned Serial No. 2000-38084, an application entitled "Apparatus and Method for Gating Data Rate Control Channel in an HDR Mobile Communication System" filed in the Korean Industrial Property Office on Jul. 27, 2000 and assigned Serial No. 2000-45394, the contents of each of which are hereby incorporated by reference.

BACKGROUND OF THE INVENTION

1. Field of the Invention

The present invention relates generally to an apparatus and method for transmitting a data rate control (DRC) channel in a mobile communication system employing a high data rate (HDR) technique, and in particular, to an apparatus and method for gating or repeating transmission of a DRC channel.

2. Description of the Related Art

In an IS-2000 communication system, in a good channel state, a base station and a mobile station perform power control in order to perform communication at a prescribed data rate. On the other hand, in an HDR mobile communication system, access terminals (corresponding to the mobile stations in the IS-2000 system) transmit DRC to an access network (corresponding to the base station in the IS-2000 system) at intervals of a predetermined number of slots, and the access network then analyzes the DRCs received from the access terminals and selectively transmits data only to the access terminals in a good channel state after controlling a data rate. The HDR system has a forward link with highly increased throughput, so that it transmits a large amount of data per unit time in a good channel state and transmits a small amount of data per unit time in a bad channel state, by varying a length of a packet using a single common data channel within the limit of the maximum power of the access network. That is, the HDR system transmits data to only one of the access terminals within a concerned access network at a certain time, through a common data channel. The HDR mobile communication system transmits channel state information and data rate control (DRC) information using a DRC channel. Regarding the DRC, the access terminal measures a carrier-to-interference ratio (C/I) of a pilot signal transmitted over a forward link, creates the DRC based on the measured C/I, and then reports the created DRC to the access network over the DRC channel.

The pilot signal is used for initial sync acquisition of data transmitted from the access terminal to the access network, for channel recovery, and for indicating reverse power control information. Meanwhile, a reverse data rate indicator (RRI), used in the HDR system, is a signal for indicating a data rate of a reverse link and synchronizing (or time-aligning) frames each comprised of 16 slots. The DRC and the pilot signal are transmitted on a time division multiplexing (TDM) basis. Further, the RRI signal provides an index inserted in a punctured part of an encoded packet of the pilot signal, so as to help the access network to determine a data rate. Table 1 below shows reverse data rate indexes according to reverse data rates.

TABLE 1

| | Data Rate (Kbps) | | | | | |
|---|---|---|---|---|---|---|
| | 4.8 | 9.6 | 19.2 | 38.4 | 76.8 | 153.6 |
| Reverse Data Rate Indexes | 1 | 2 | 3 | 4 | 5 | 6 |

In Table 1, when the reverse link is transmitted at a data rate of 153.6 Kbsp, a 3-bit symbol is transmitted to the access network over a data rate index channel through Walsh symbol repetition using an orthogonal code of length 4. Table 2 below shows an encoding table of the DRC channel.

TABLE 2

| Required Data Rate (Kbps) | 4-bit DRC | Codeword (8, 4, 4) |
|---|---|---|
| 38.4 | 0000 | 00000000 |
| 76.8 | 0001 | 11111111 |
| 102.4 | 0010 | 01010101 |
| 153.6 (short) | 0011 | 10101010 |
| 204.8 | 0100 | 00110011 |
| 307.2 (short) | 0101 | 11001100 |
| 614.4 | 0110 | 01100110 |
| 921.6 | 0111 | 10011001 |
| 1228.8 | 1000 | 00001111 |
| 1843.2 | 1001 | 11110000 |
| 2457.6 | 1010 | 01011010 |
| Reserved | 1011 | 10100101 |
| 153.6 (long) | 1100 | 00111100 |
| 307.2 (long) | 1101 | 11000011 |
| Reserved | 1110 | 01101001 |
| Null rate | 1111 | 10010110 |

The access terminal measures a C/I of a signal transmitted from the access network, converts the measured C/I into a codeword associated with the data rate required by the access network in accordance with Table 2, and then reports the results to the access network. As shown in Table 2, the DRC signal is comprised of a 4-bit symbol. The 4-bit symbol is converted into an 8-bit codeword by block coding. The codewords are mapped with the required data rates of the forward traffic channel on a one-to-one basis.

FIG. 1 illustrates a structure of a reverse link transmitter in a common HDR mobile communication system. Referring to FIG. 1, a multiplier 102 channel-spreads a pilot channel 101 by multiplying it by an orthogonal function $W_0^4$ of length 4 at every slot, and outputs a 1024-chip non-modulated signal having a value '0'. RRI 103 is provided to an 8-ary orthogonal modulator 105. The 8-ary orthogonal modulator 105 performs 8-ary orthogonal modulation on the provided RRI and outputs a Walsh symbol. A Walsh symbol repeater 107 repeats the Walsh symbol output from the 8-ary orthogonal modulator 105, and provides its output to a multiplier 109. The multiplier 109 multiplies the Walsh symbol output from the Walsh symbol repeater 107 by an orthogonal function $W_0^4$ of length 4 at every slot, and outputs 64 chips per slot. A (8,4,4) block encoder 117 block-encodes an input DRC 115. A codeword repeater 119 repeats the block-encoded DRC a predetermined number of times. A multiplier 121 spreads the symbols output from the codeword repeater 119 by multiplying them by an orthogonal function $W_0^2$ of length 2. A Walsh cover generator 113 outputs an orthogonal function of length 8 corresponding to an input DRC Walsh cover index 111. A multiplier 123 multiplies an output of the multiplier 121 by an output of the Walsh cover generator 113. A multiplier 125 multiplies data output from the multiplier 123 by an orthogonal function $W_0^4$ of length 4. A time division multiplexer (TDM) 127 time-multiplexes the pilot channel signal, the RRI channel signal and the DRC channel signal output respectively from the multipliers 102, 109 and 125, and provides its output to a complex spreader 141 as an in-phase component. An encoder 131 encodes an input traffic channel signal 129. A modulator 133 performs BPSK (Binary Phase Shift Keying) modulation on the encoded traffic data. An interleaver 135 interleaves the BPSK-modulated data. A data channel gain controller 137 gain-controls the output of the interleaver 135. A multiplier 139 channel-spreads the signal output from the data channel gain controller 137 by multiplying it by an orthogonal function $W_2^4$ of length 4, and provides its output to the complex spreader 141 as a quadrature phase component. The complex spreader 141 complex-spreads the in-phase component signal and the quadrature phase component signal. A baseband filter 143 baseband-filters the complex-spread signal from the complex spreader 141.

As described above, the pilot channel signal, the RRI channel signal and the DRC channel signal are transmitted to the access network after time multiplexing.

FIG. 2 illustrates a method for transmitting a DRC channel in a general HDR system. As illustrated, each frame is comprised of 16 slots each having a length of 2048 chips (=1.66 msec). In each slot, the pilot channel signal and the DRC channel signal are time-multiplexed in a unit of 46 chips, before transmission. Every user (regardless of to which user group it belongs) continuously transmits the time-multiplexed signal of the pilot channel signal and the DRC channel signal. In this case, there occurs interference between the users.

That is, as stated above, the HDR system continuously transmits the pilot and the DRC to the access network while the data service is connected. Meanwhile, for the high-speed data transmission, information on the C/I and the DRC signal, transmitted over the reverse link, must be correct. However, as shown in FIG. 2, since each user continuously reports the time-multiplexed signal of the pilot signal and the DRC to the access network, there occurs interference between the pilots. If the access network fails to correctly detect the DRC, the access network cannot correctly schedule the data rate and the sector required by the access terminal, so that it is not possible to service additional new users. That is, in the conventional HDR system, when the number of users is increased, it is difficult for the access network to detect the DRC correctly, making it impossible to service new users.

Although FIG. 2 shows a case where the pilot channel signal and the DRC channel signal are subjected to time multiplexing, the same problem may occur even in the case where the pilot channel signal and the DRC channel signal are subjected to code division multiplexing.

SUMMARY OF THE INVENTION

It is, therefore, an object of the present invention to provide an apparatus and method for gating transmission of a DRC channel to prevent interference between DRC channels in an HDR mobile communication system.

It is another object of the present invention to provide an apparatus and method for transmitting a DRC channel at transmission power lower than that of a pilot channel by repeating the DRC channel, in order to prevent interference between DRC channels in an HDR mobile communication system.

It is further another object of the present invention to provide an apparatus and method for determining a slotting rate at which an access terminal gates transmission of a DRC channel by inverting a DRC information length in a mobile communication system, wherein an access network transmits the DRC information length indicating a frequency of repeating DRC information at a plurality of time slots, to the access terminal during call setup.

To achieve the above and other objects, there is provided a communication method in a mobile communication system in which an access terminal transmits to an access network (DRC information) indicating a selected one of forward data rates requested by the access terminal. The access network designates a DRC information length (DRCLength) indicating a number of slots where the DRC information is repeated and transmits the designated DRC information length to the access terminal. The access terminal gates transmission of DRC information to the access terminal at one time slot in every DRC information length received from the access network.

BRIEF DESCRIPTION OF THE DRAWINGS

The above and other objects, features and advantages of the present invention will become more apparent from the following detailed description when taken in conjunction with the accompanying drawings in which.

Figure 12:
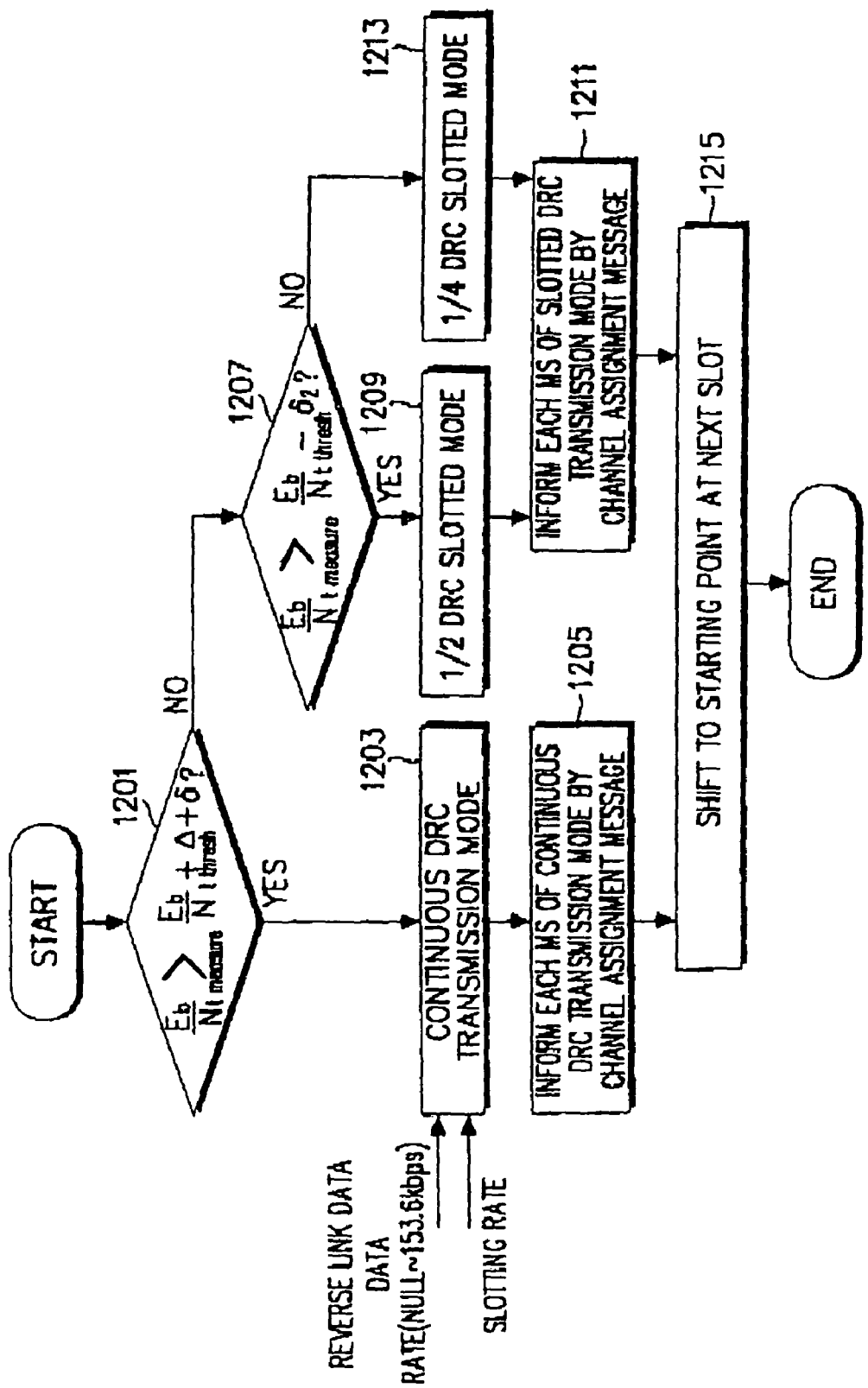
Figure 13:
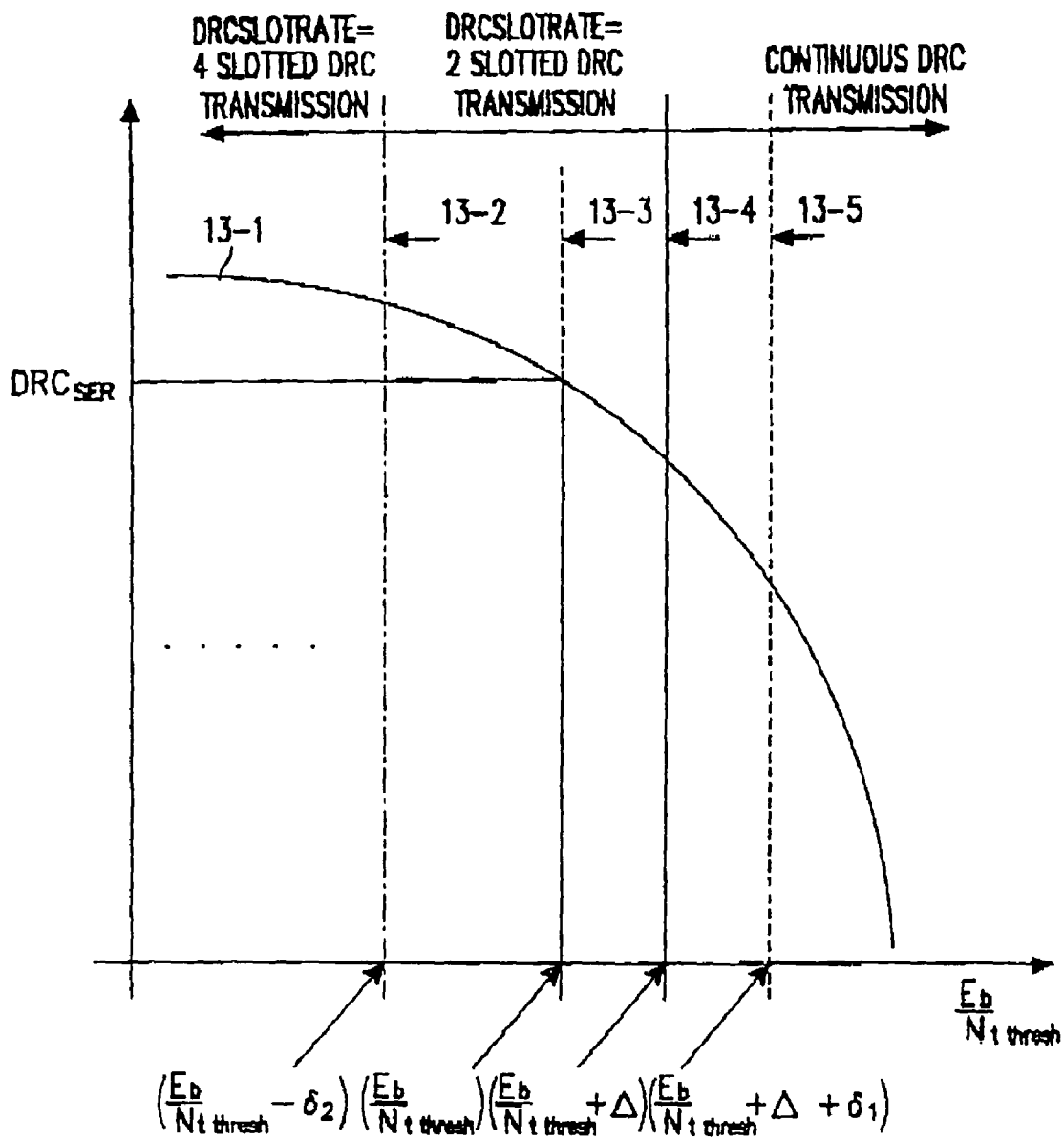
Figure 14:
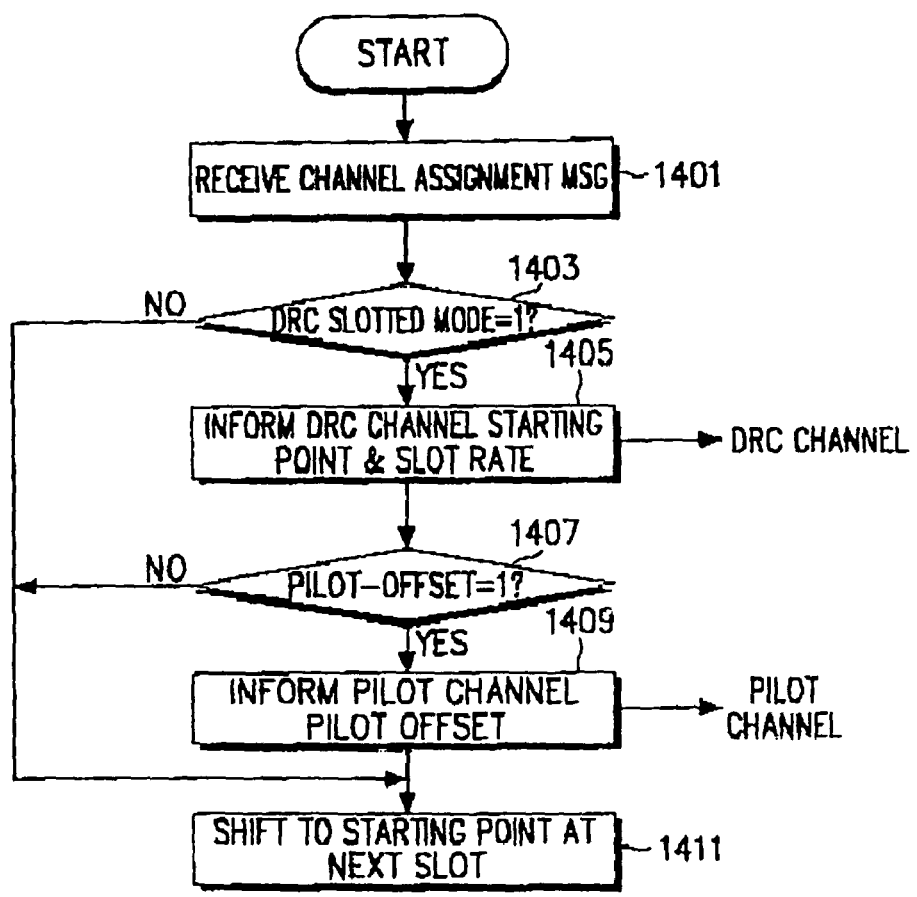
Figure 15:
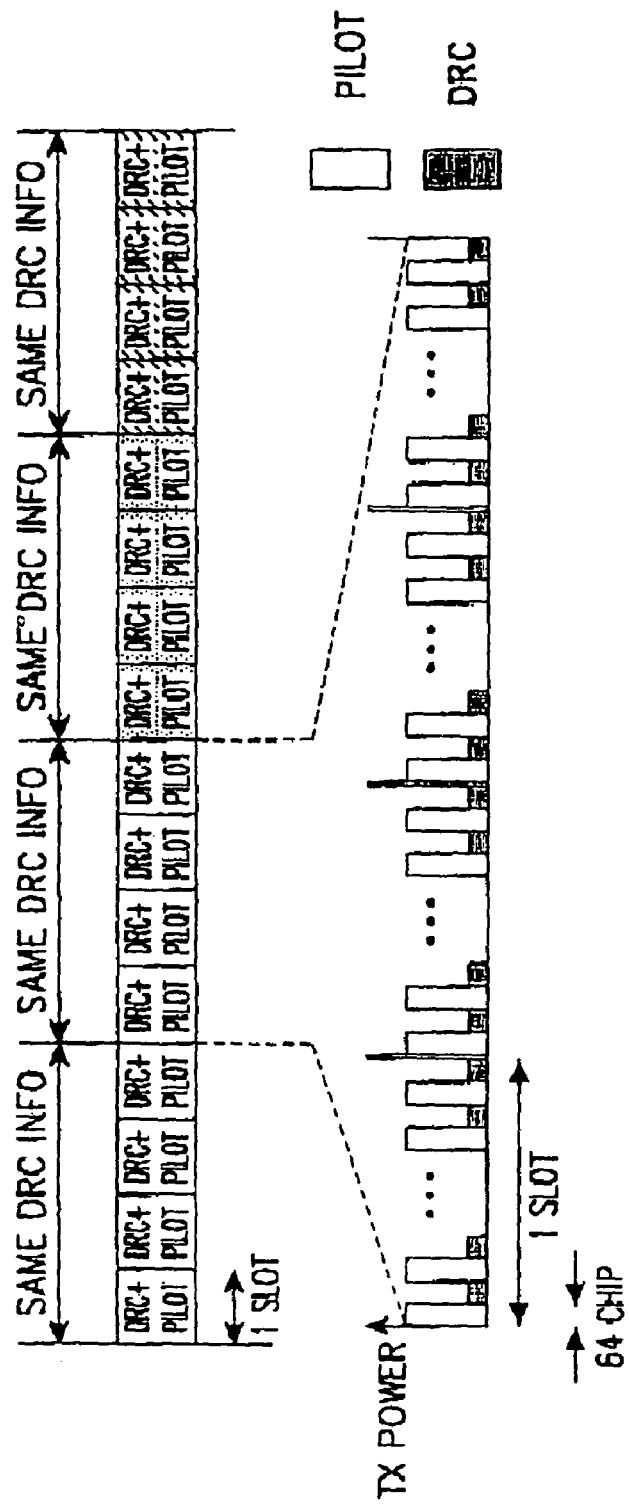
Figure 16:
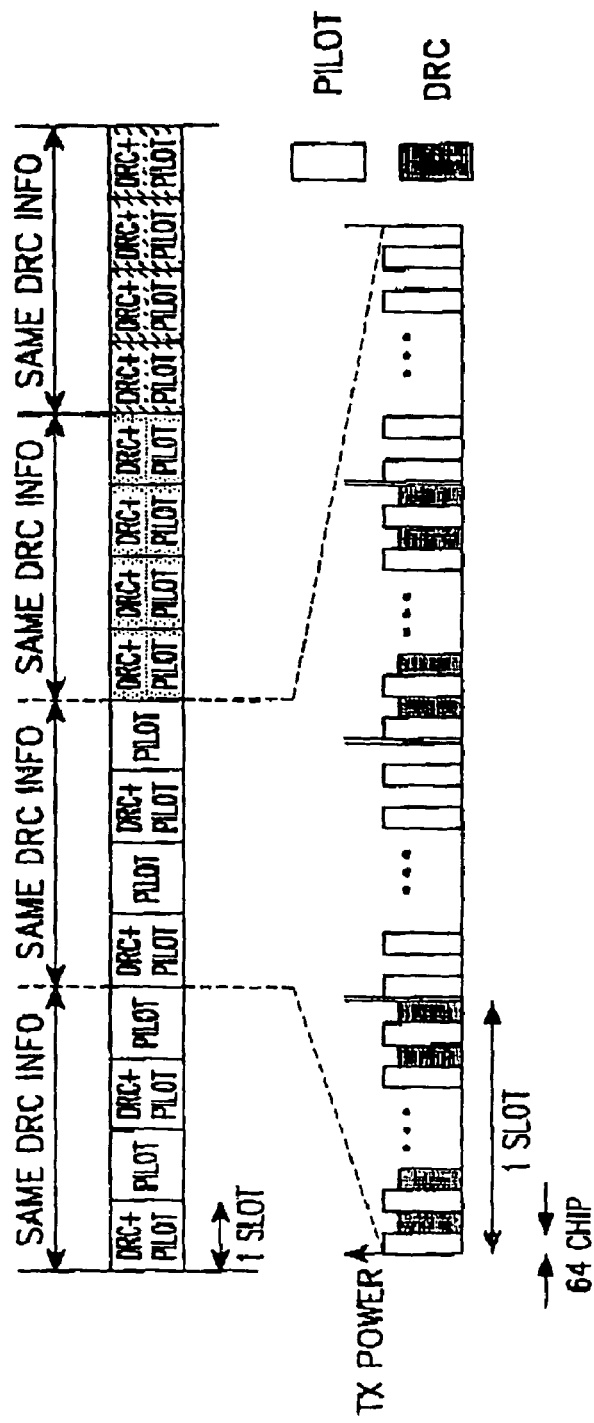
Figure 17:
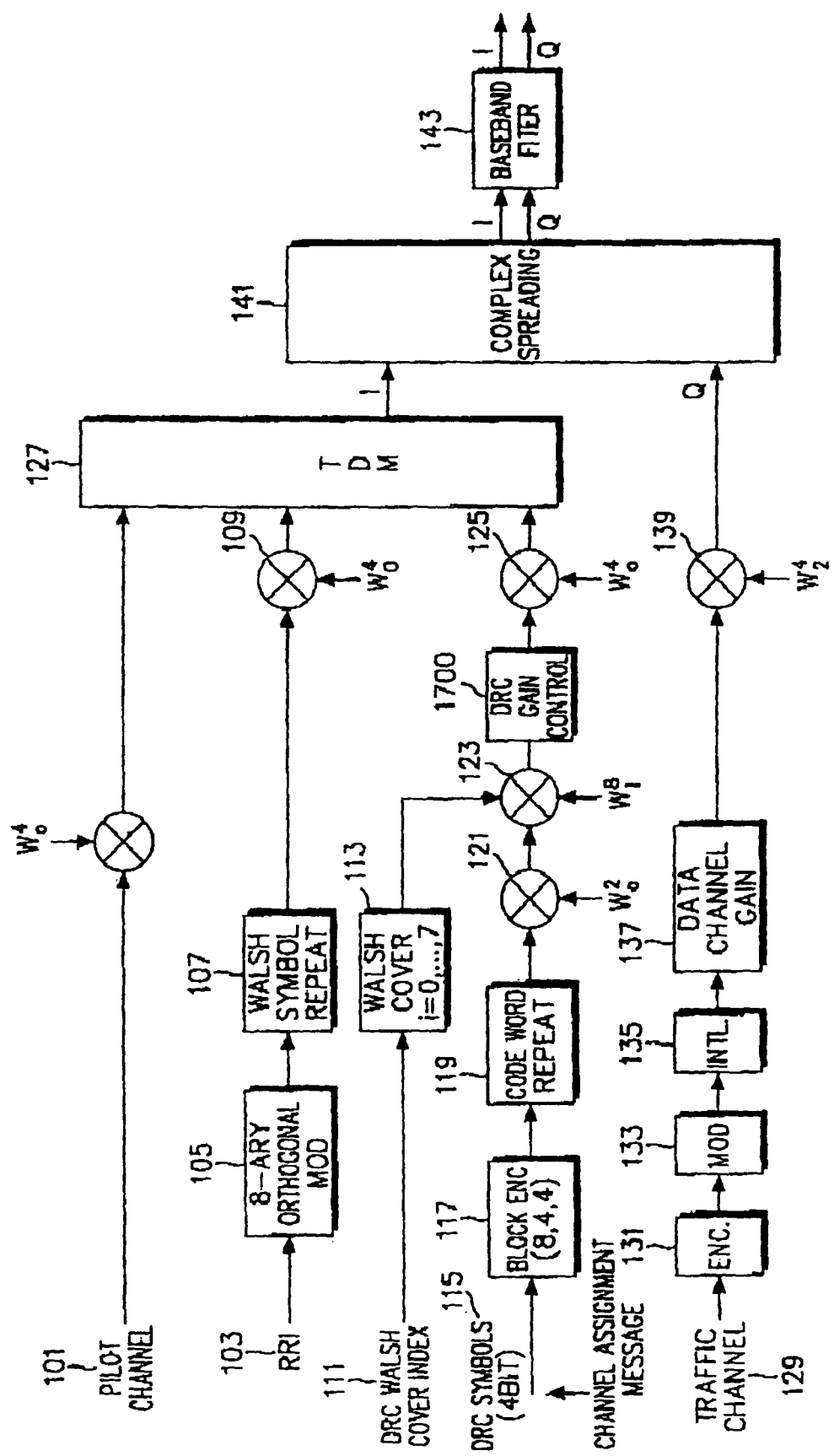
Figure 18:
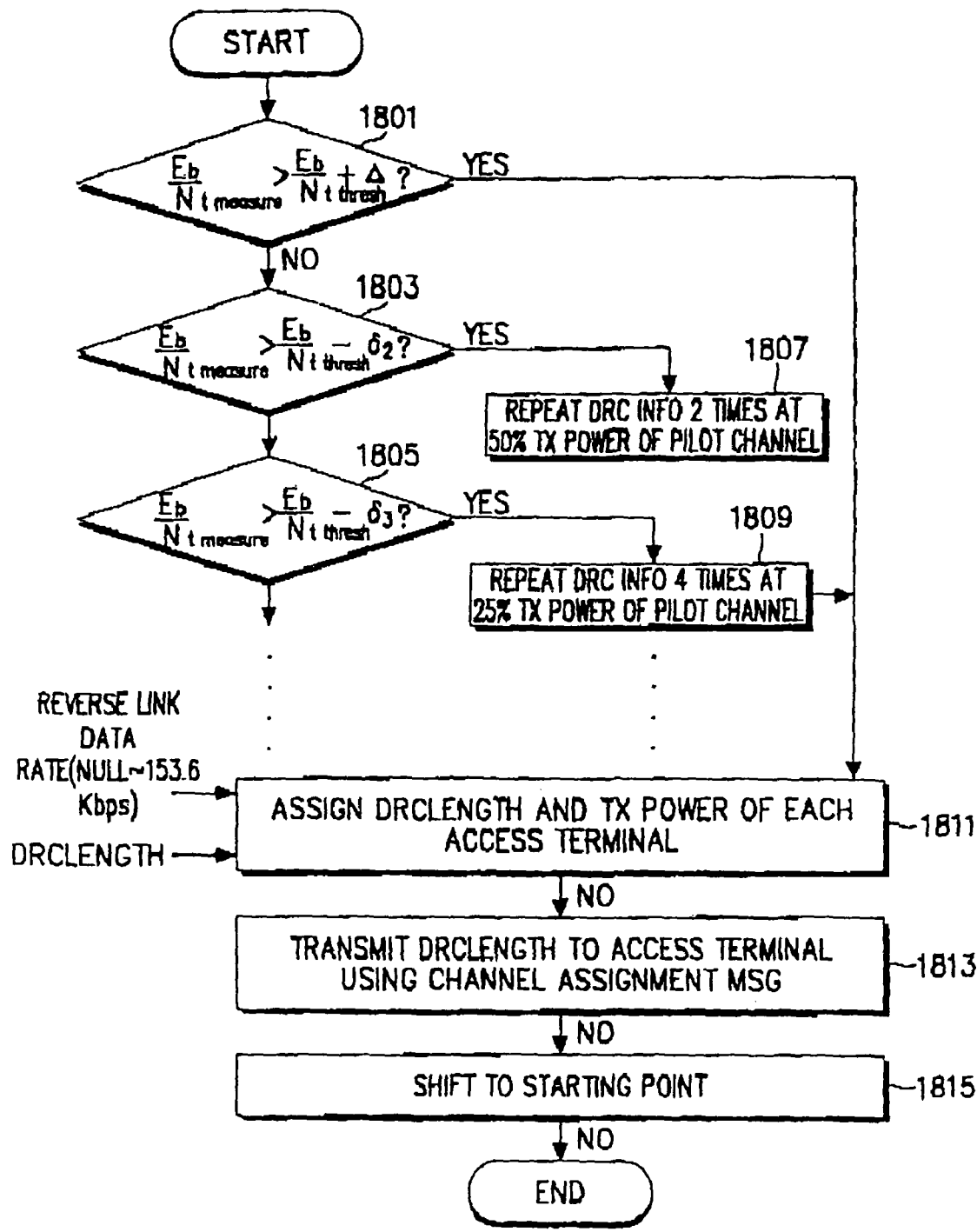
Figure 19:
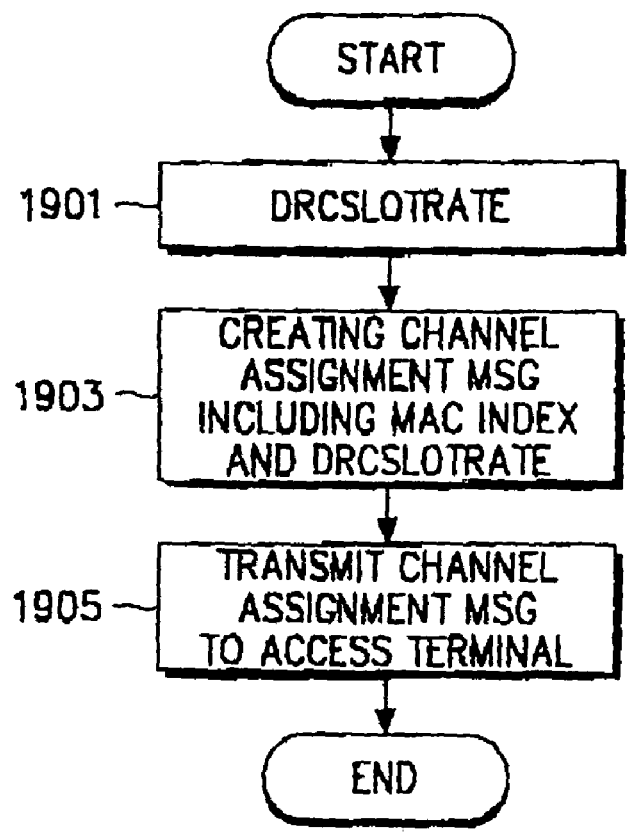
Figure 20:
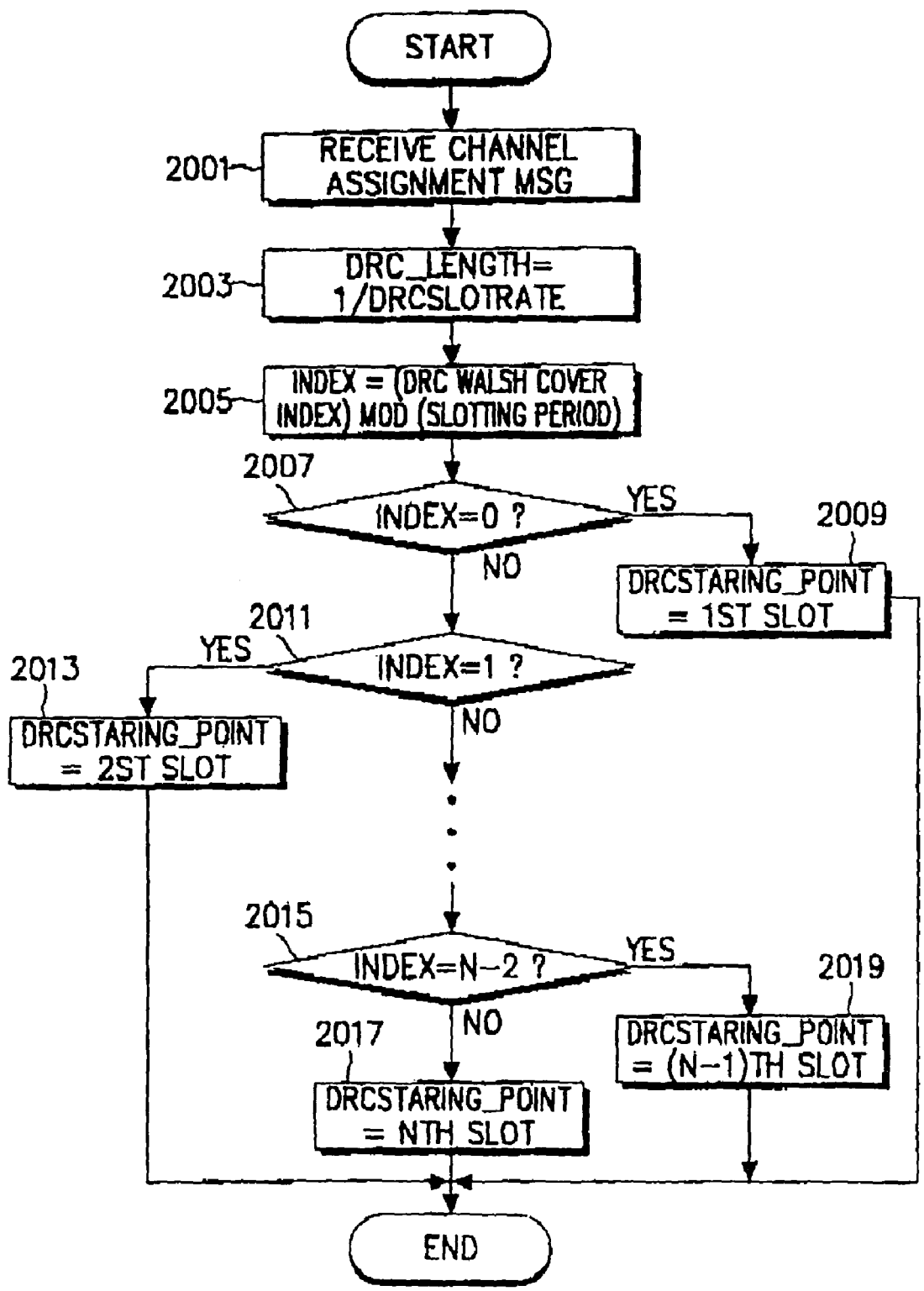
Figure 21:
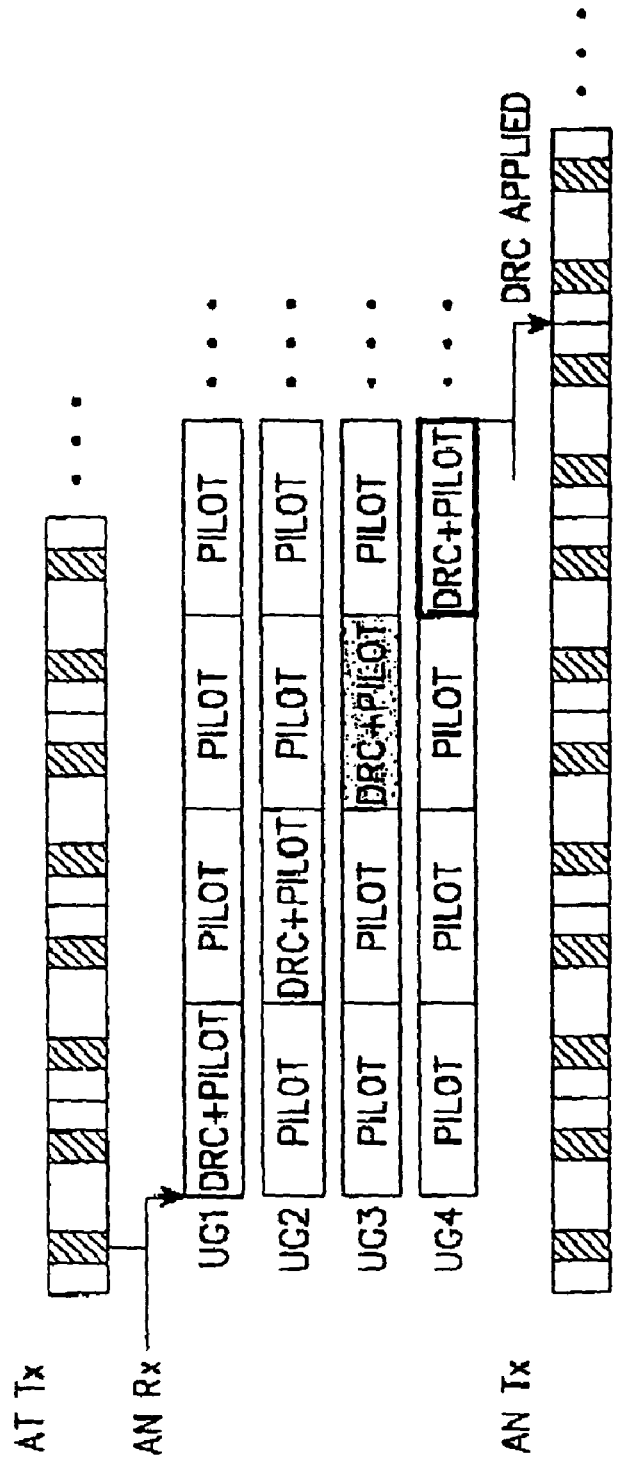
Figure 22:
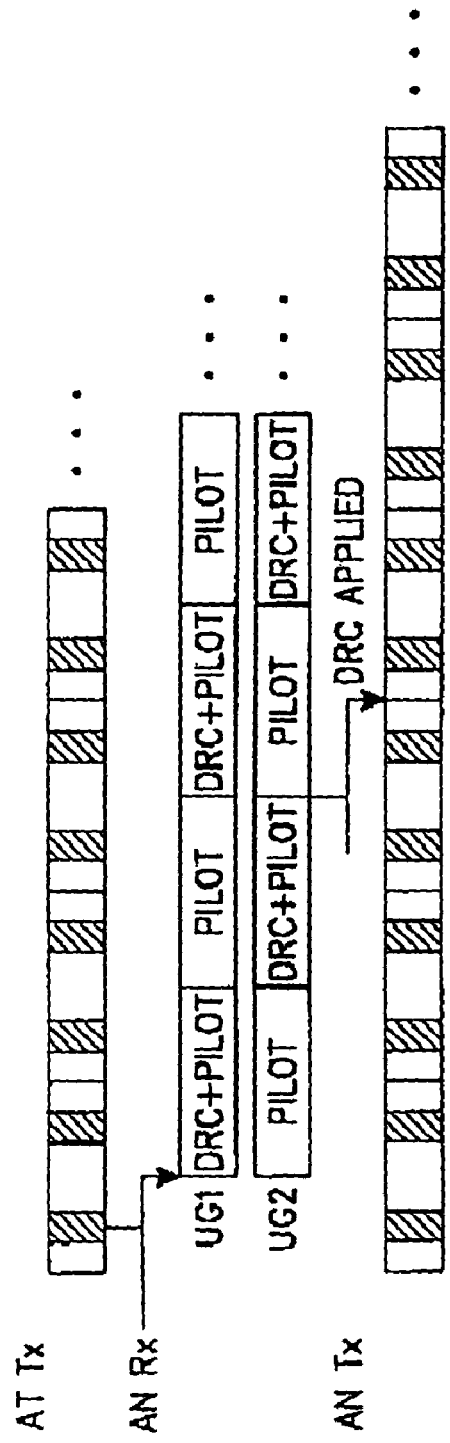
Figure 23:
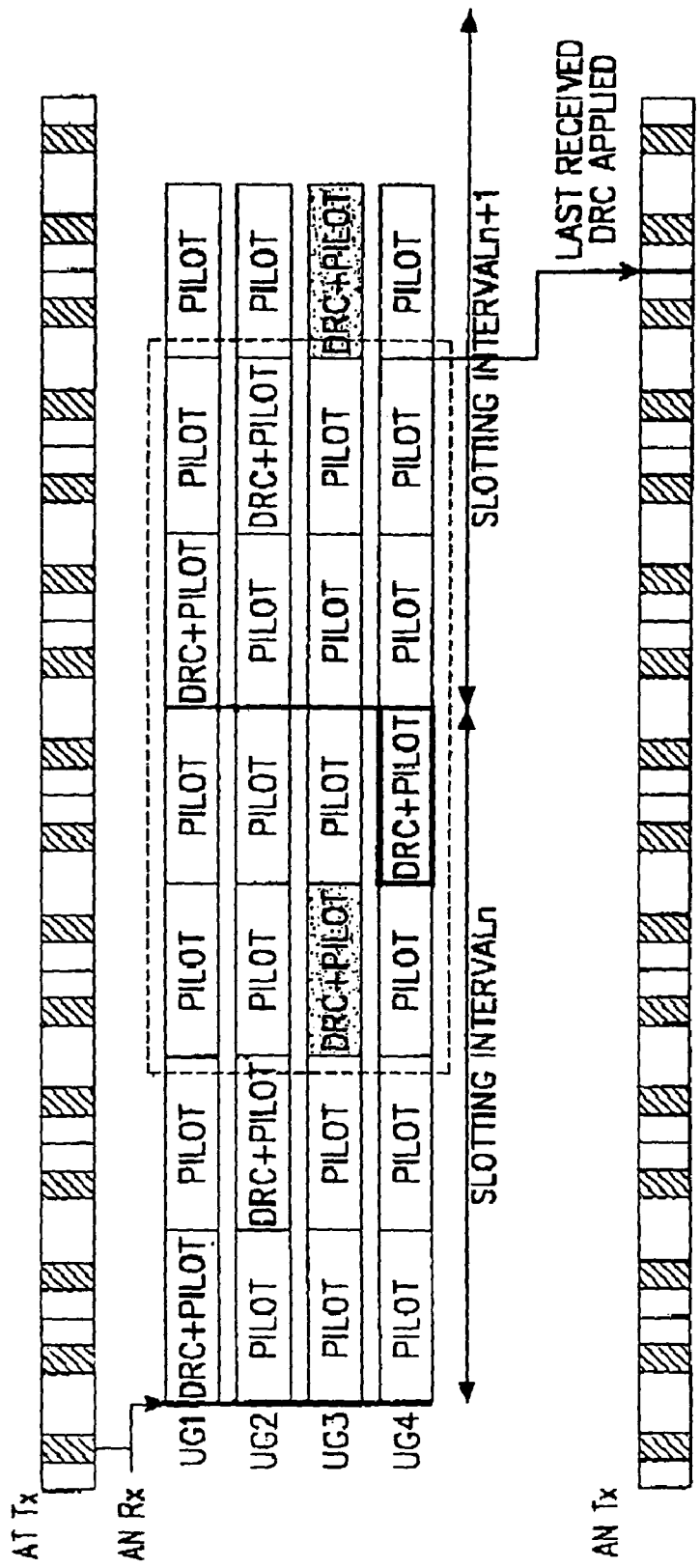
Figure 24:
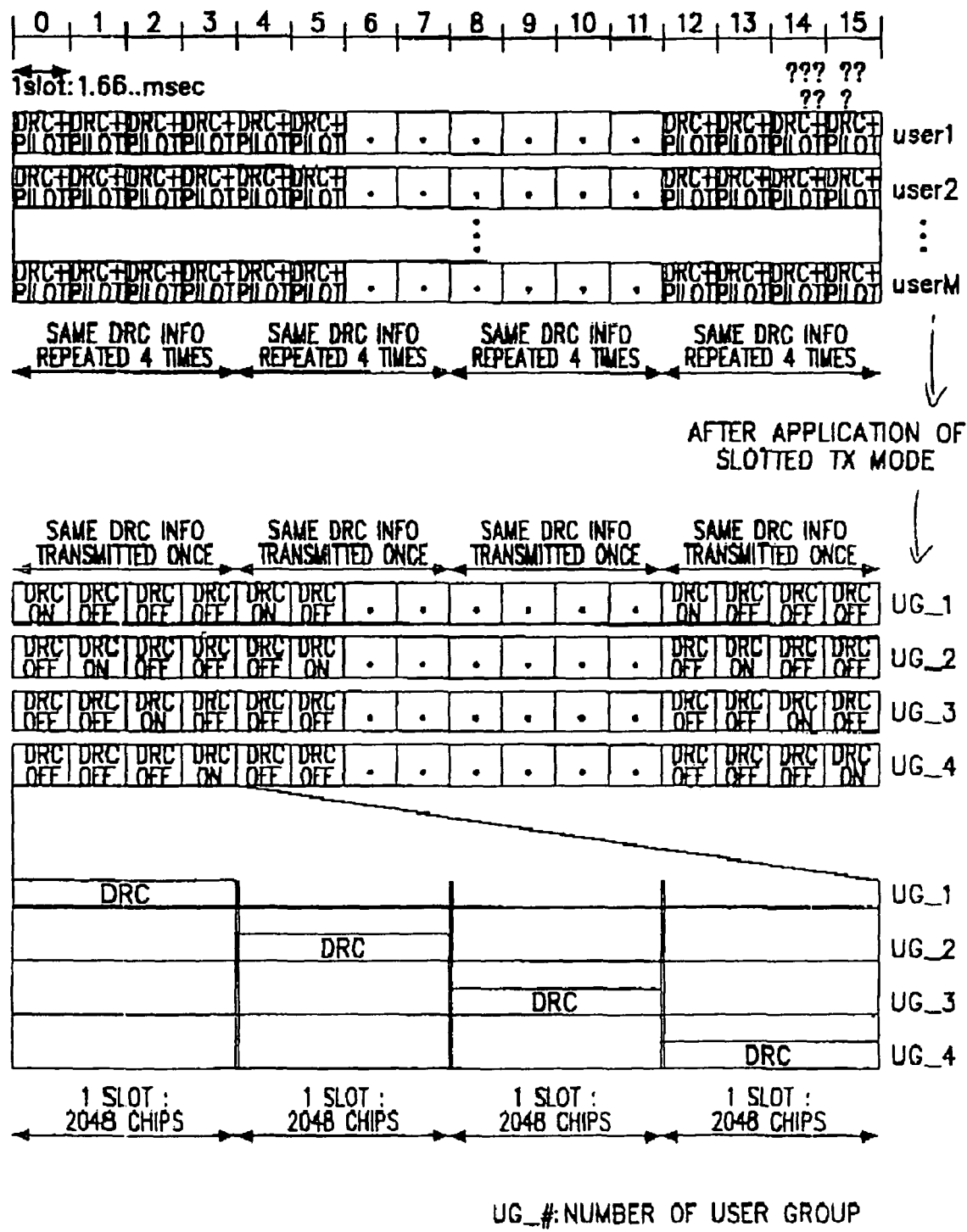
Figure 25:
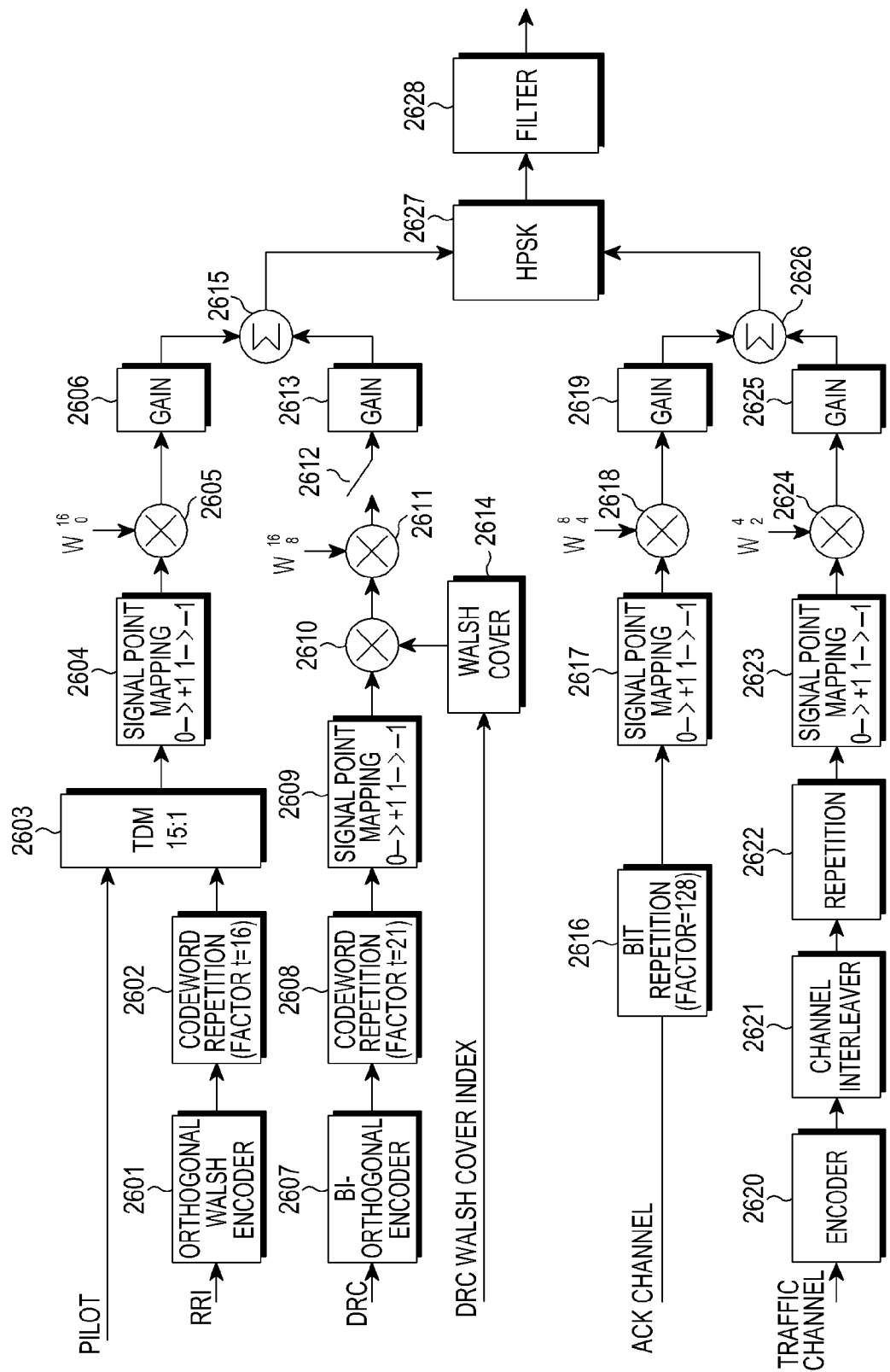
Figure 26:
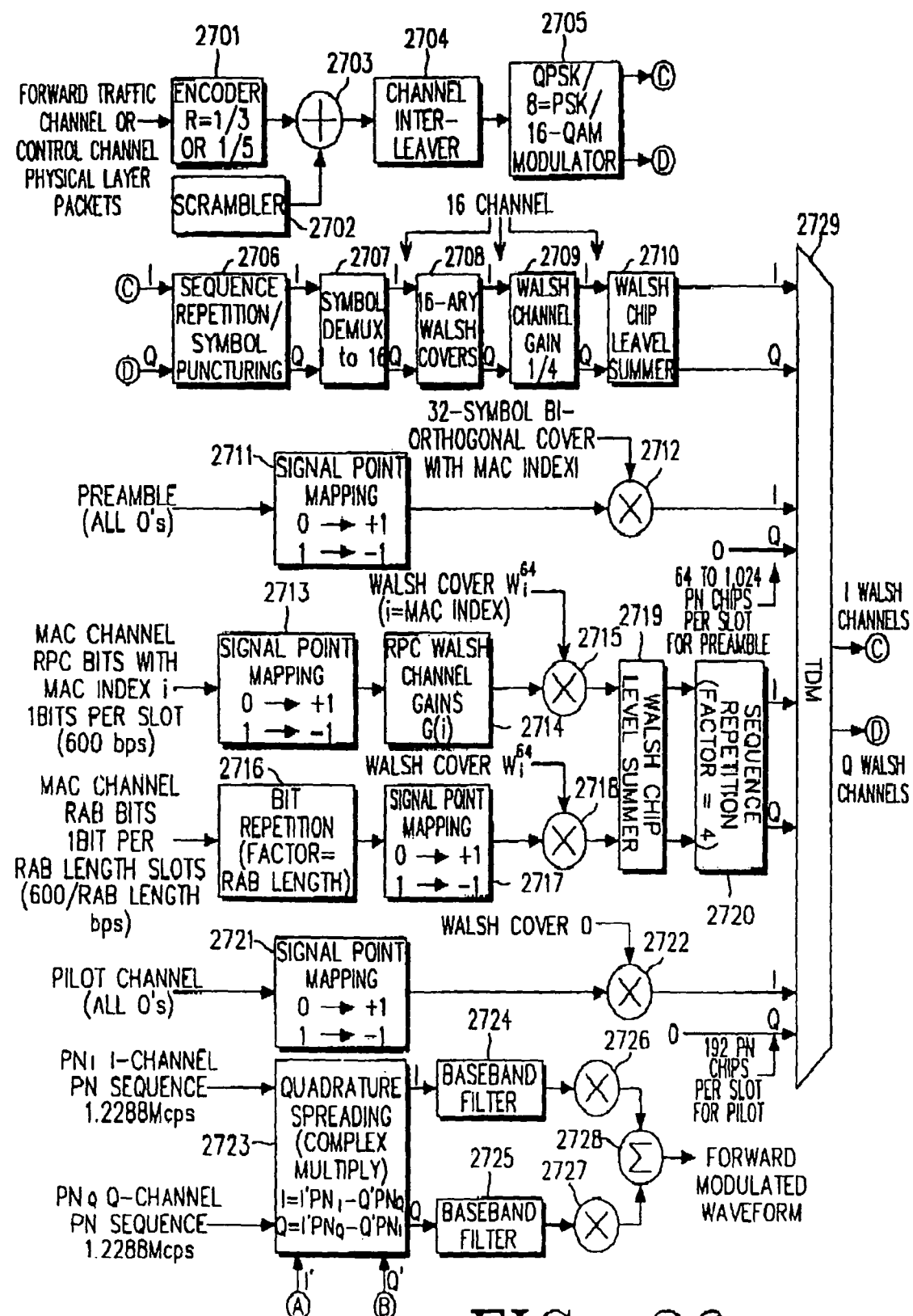
Figure 27:
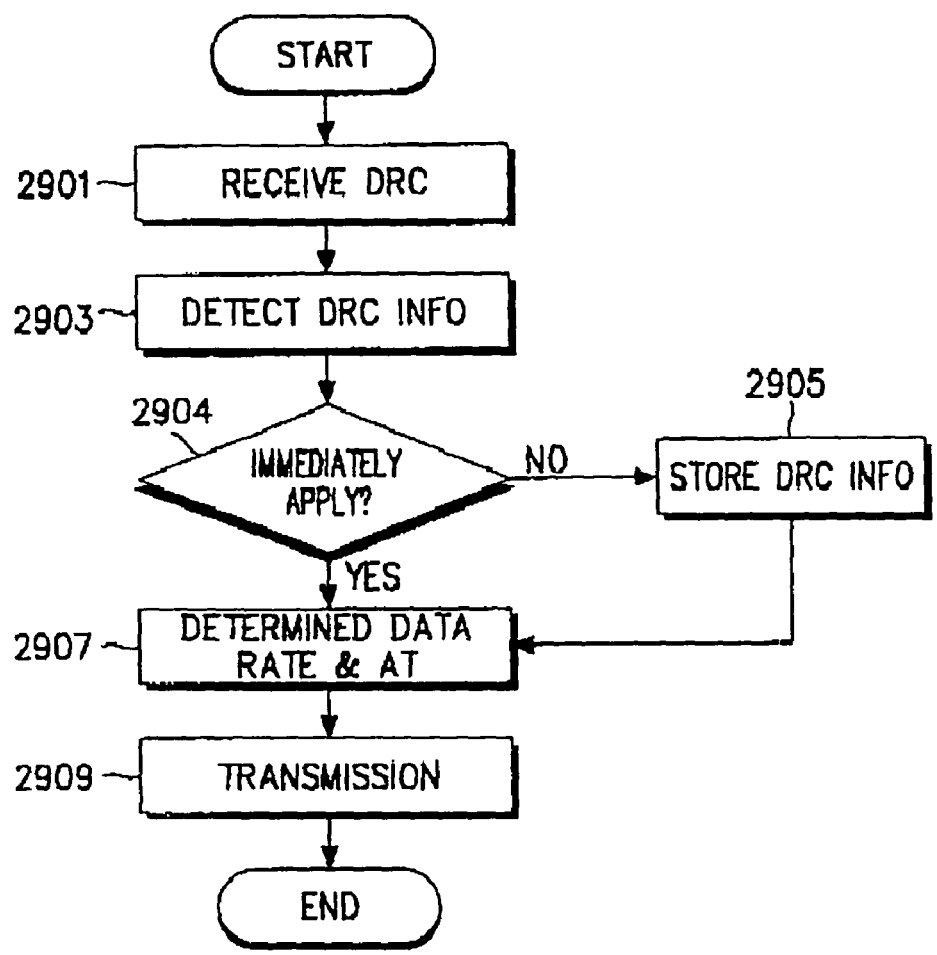
Figure 28:
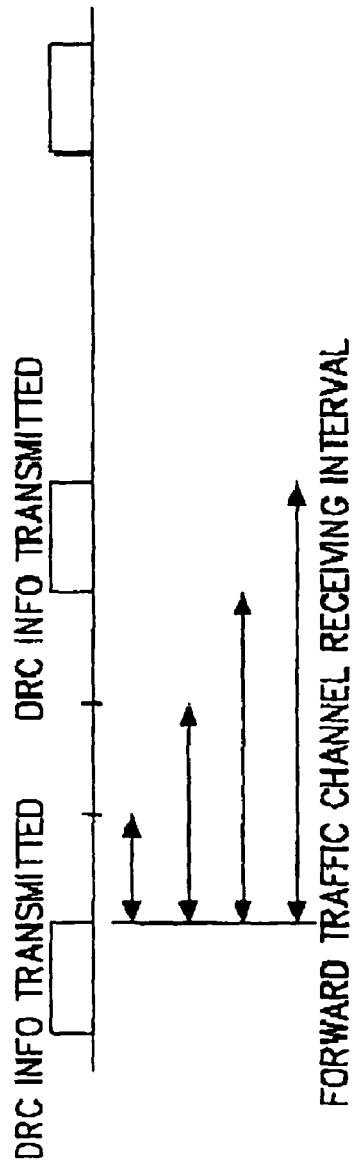
Figure 29:
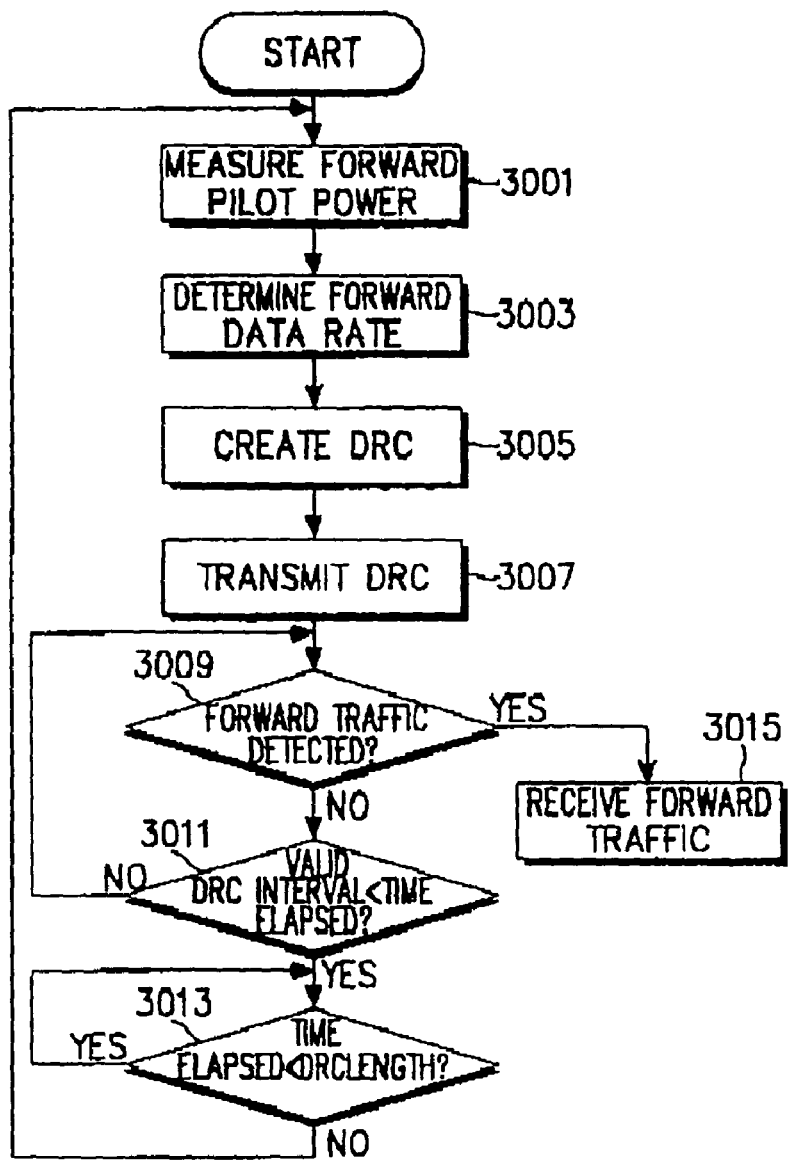

value in the access network of the HDR mobile communication system according to an embodiment of the present invention;

FIG. 12 is a flow chart illustrating a method for switching from a gated DRC transmission mode of a reverse link to a continuous transmission mode in the access terminal of the HDR mobile communication system according to an embodiment of the present invention;

FIG. 13 is a diagram illustrating a boundary value between a measured $$\frac{E_b}{N_{t_{measure}}}$$

value and a $$\frac{E_b}{N_{t_{measure}}}$$

value for determining a DRC channel symbol error rate and a transmission mode in the access network of the HDR mobile communication system according to an embodiment of the present invention;

FIG. 14 is a flow chart illustrating a method for gating transmission of a DRC channel of a reverse link in the access terminal of the HDR mobile communication system according to an embodiment of the present invention;

FIG. 15 is a diagram illustrating a method for transmitting the same DRC channel information over 4 consecutive slots at 25% of transmission power of the pilot in the HDR mobile communication system according to an embodiment of the present invention;

FIG. 16 is a diagram illustrating a case where one method for transmitting the same DRC information over 4 consecutive slots at transmission power lower than that of the pilot and another method for gating transmission of the DRC information are simultaneously applied to the HDR mobile communication system according to an embodiment of the present invention;

FIG. 17 is a diagram illustrating a structure of a reverse link transmitter for transmitting a DRC channel in the HDR mobile communication system according to another embodiment of the present invention;

FIG. 18 is a flow chart illustrating a method for switching from the existing continuous DRC transmission mode to a transmission mode for transmitting the same DRC channel information over at least 2 consecutive slots at transmission power lower than that of the pilot, when a value calculated by the access network by measuring a signal transmitted from each user exceeds a capacity of the reverse link;

FIG. 19 is a flow chart illustrating a procedure for transmitting a signaling message including slotting rate information in the access network in a gated DRC transmission mode according to an embodiment of the present invention;

FIG. 20 is a flow chart illustrating a procedure for determining a DRC information transmission start slot by receiving a signaling message including the slotting rate information in the access terminal in the gated DRC transmission mode according to an embodiment of the present invention;

FIG. 21 is a diagram illustrating a DRC information application start point in the transmission method in which the slotting rate=¼ of the slotted transmission mode is applied in the case where the same DRC is repeated 4 times (DRCLength=4) according to an embodiment of the present invention;

FIG. 22 is a diagram illustrating a DRC information application start point in a transmission method in which a slotting rate=½ of the slotted transmission mode for the case where the same DRC information is repeated 2 times (DRCLength=2) according to an embodiment of the present invention;

FIG. 23 is a diagram illustrating a DRC information application start point in which a slotting rate=¼ of the DRC transmission mode for the case where the same DRC information is repeated 4 times (DRCLength=4) according to an embodiment of the present invention;

FIG. 24 is a diagram illustrating a method for transmitting DRC channels divided into 4 user groups in the case where the pilot and the DRC channel are subjected to code division multiplexing in the HDR mobile communication system according to an embodiment of the present invention;

FIG. 25 is a diagram illustrating a structure of a reverse link transmitter for transmitting a DRC channel, in the case where the pilot and the DRC channel are subjected to code division multiplexing in the HDR mobile communication system according to an embodiment of the present invention;

FIG. 26 is a diagram illustrating a structure of a forward link transmitter in the HDR mobile communication system according to an embodiment of the present invention;

FIG. 27 is a flow chart illustrating a procedure for determining a data rate and an access terminal for receiving the forward channel described in FIG. 28;

FIG. 28 is a diagram illustrating an interval for checking a forward data channel until the access terminal creates the next DRC information after reporting the DRC information to the access network; and FIG. 29 is a flow chart illustrating a procedure for detecting forward traffic after transmitting the DRC information in the access terminal according to an embodiment of the present invention.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, the term "slotting rate (DRC-SlotRate)" refers to a rate indicating at every how many slots the DRC channel is transmitted during gated transmission of the DRC channel. In addition, the term "user group" refers to a set of users that transmit the DRC channel to the access network in the same slotting period, and have the same DRC transmission start point within the frame. Here, not one but several users exist in each of the user groups.

Further, the term "repetition frequency (DRCLength)" refers to the frequency of transmitting the same DRC channels, which indicates at every how many slots the same DRC channel is repeated during repeated transmission of the same DRC channel. The slotting rate (DRCSlotRate) is defined as a reciprocal of the repetition frequency (DRCLength) according to the present invention.

In addition, the term "continuous transmission mode" refers to a mode where the user continuously transmits the DRC channel at every slot, and the term "gated (or slotted) transmission mode" refers to a mode where the user periodically gates transmission of the DRC channel according to the slotting rate (or gating rate) designated by the access network. Further, the term "repeated transmission mode" refers to a mode where the user repeatedly transmits the same DRC channel according to the repetition frequency DRCLength designated by the access network. The present invention can switch from the continuous transmission mode to the gated transmission mode, from the continuous transmission mode to the repeated transmission mode and from the repeated transmission mode to the gated transmission mode, and vice versa.

Figure 3:
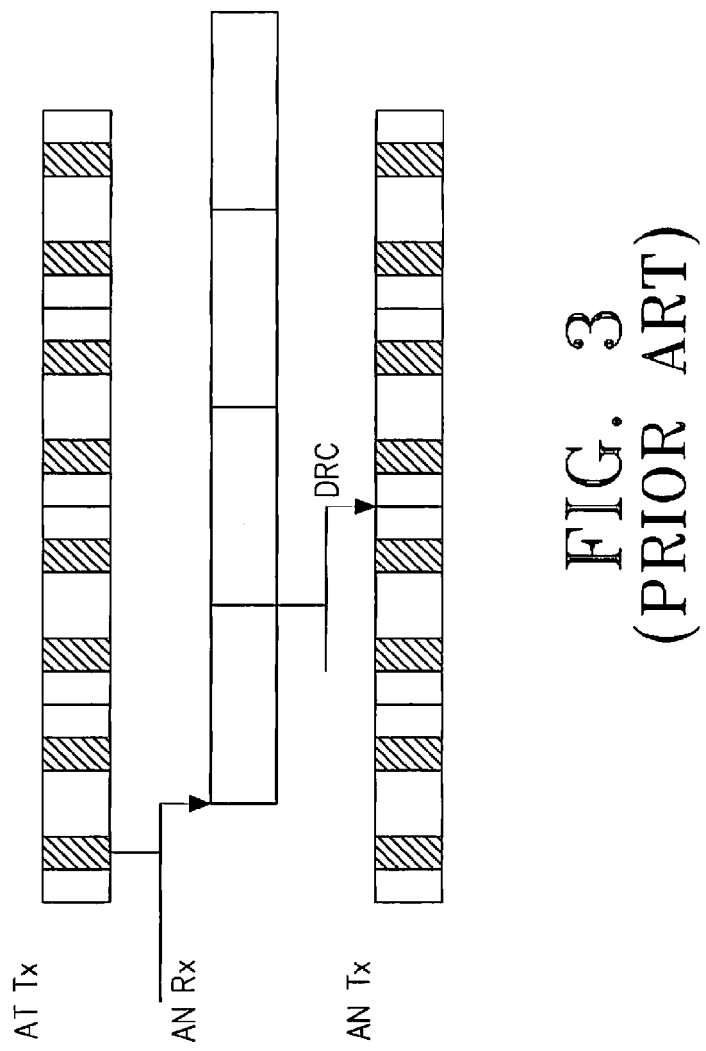
FIG. 3 is a diagram illustrating how an access network applies a data rate required by an access terminal to transmission data based on a DRC channel received from the access terminal in the general HDR mobile communication system.

FIG. 3 illustrates the timing for which an access terminal (AT) measures a C/I of a signal transmitted from an access network (AN) and transmits a DRC channel requiring a specific data rate to the access network, and the access network then applies the data rate required by the access terminal to transmission data based on the DRC channel received from the access terminal. In FIG. 3, the access network applies the required data rate through the DRC channel, a half slot after receiving the DRC channel from the access terminal. Therefore, the HDR system schedules the user DRCs to be transmitted a half slot before one encoder packet is ended, and provides a data service to the user in a good channel state at the next encoder packet at the maximum power.

Now, a description will be made regarding a method for gating transmission of a DRC channel in order to reduce interference between user DRCs when a capacity of the reverse link is exceeded, according to an embodiment of the present invention.

Figure 4:
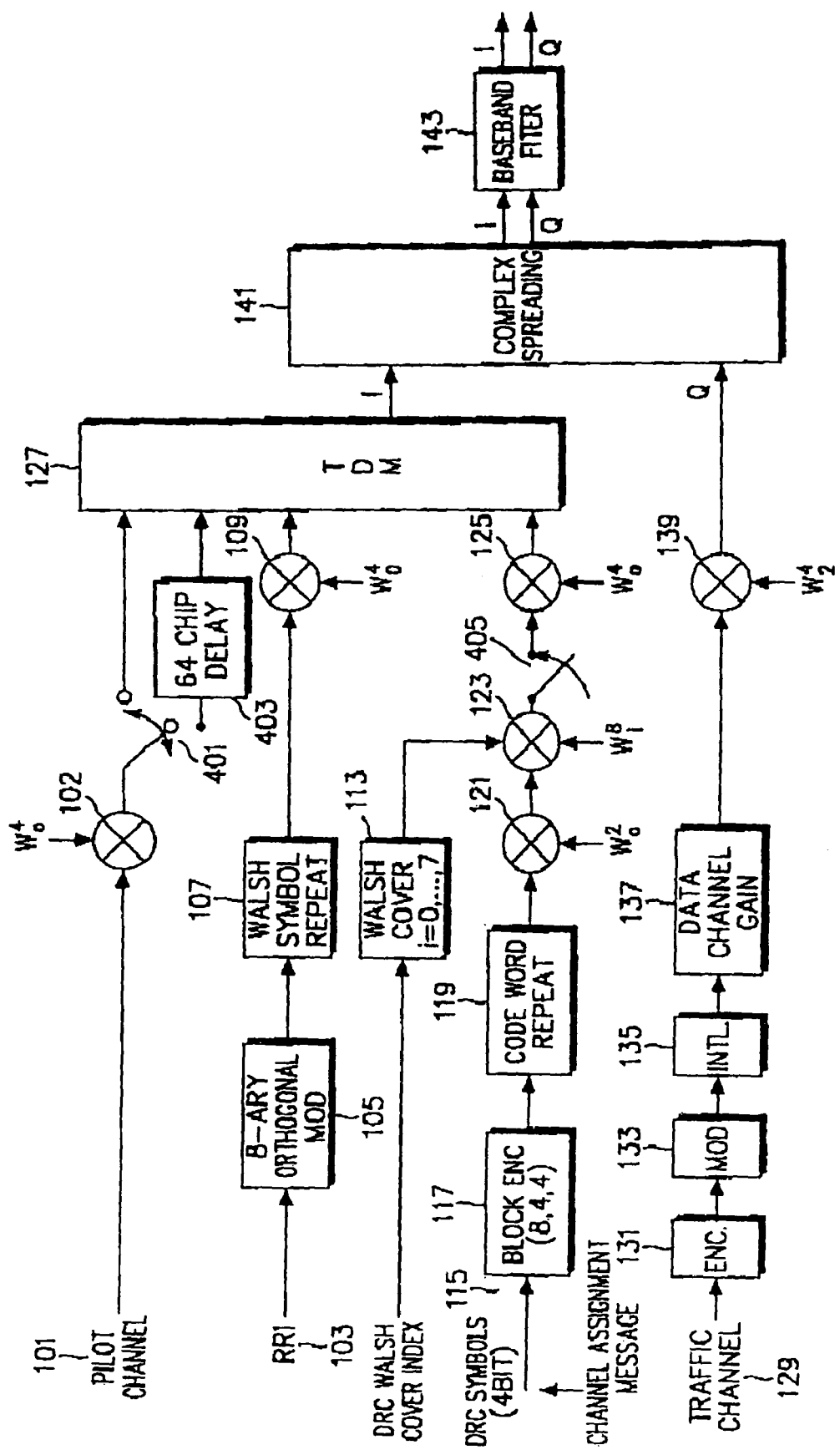
FIG. 4 is a diagram illustrating a structure of a reverse link transmitter for transmitting a DRC channel in an HDR mobile communication system according to an embodiment of the present invention.

FIG. 4 illustrates a structure of a reverse link transmitter for transmitting a DRC channel in an HDR mobile communication system according to an embodiment of the present invention.

Referring to FIG. 4, a multiplier 102 orthogonal-spreads pilot channel data 101 by multiplying it by a predetermined orthogonal code $W_0^4$. A switch 401, under the control of a controller (not shown), switches the output of the multiplier 102 to a time division multiplexer (TDM) 127 or a 64-chip delay 403. The 64-chip delay 403 delays (or buffers) the output of the multiplier 102 for a predetermined time (e.g., 64-chip interval) and provides its output to the multiplexer 127.

An 8-ary orthogonal modulator 105 performs 8-ary orthogonal modulation on an input reverse rate indicator (RRI) 103 and provides an output symbol. A Walsh symbol repeater 107 repeats the symbol output from the 8-ary orthogonal modulator 105 a predetermined number of times. A multiplier 109 orthogonal-spreads the output of the Walsh symbol repeater 107 by multiplying it by the Walsh code $W_0^4$.

A (8,4,4) block encoder 117 performs (8,4,4) block encoding on input 4-bit DRC information 115. A codeword repeater 119 repeats the codeword output from the (8,4,4) block encoder 117 a predetermined number of times. A multiplier 121 orthogonal-spreads the output of the codeword repeater 119 by multiplying it by a given Walsh code $W_0^2$ of length 2.

A Walsh cover generator 113 outputs a Walsh cover for sector division by receiving a DRC Walsh cover index. A multiplier 123 multiplies the output of the multiplier 121 by the output of the Walsh cover generator 113. A switch 405, under the control of the controller, gates the output of the multiplier 123. A multiplier 125 multiplies the output of the switch 405 by the Walsh code $W_0^4$. The multiplexer 127 time-multiplexes the outputs of the multiplier 102 (or the delay 403), the multiplier 109 and the multiplier 125.

An encoder 131 encodes input traffic data, and a modulator 133 BPSK-modulates the output of the encoder 131. An interleaver 135 interleaves the output of the modulator 133. A channel gain controller 137 gain-controls the output of the interleaver 135. A multiplier 139 multiplies the output of the channel gain controller 137 by a predetermined Walsh code $W_2^4$ of length 4. A complex spreader 141 complex-spreads the output (I-channel signal) of the multiplexer 127 and the output (Q-channel signal) of the multiplier 139 by multiplying them by a predetermined PN (Pseudo Noise) code. A baseband filter 143 baseband-filters the output of the complex spreader 141. The filtered signal is converted into a radio frequency (RF) signal by frequency-up-conversion, and then transmitted to the access network.

In the common HDR mobile communication system, the reverse link is such structured that each user should report the DRC to the access network at every slot. In the present invention, when the capacity of the reverse link is exceeded (or saturated), the access terminal gates transmission of the DRC to the access network. In order to gate transmission of the DRC to the access network, the access terminal must first know information about a slotting rate, a slotting (or gating) start point and a pilot offset. The information on the slotting rate, the slotting start point and the pilot offset is transmitted directly or indirectly from the access network to the access terminal through a signaling message. When the information is directly transmitted to the access terminal, the information related to the slotting rate, the slotting start point and the pilot offset, determined by the access network, is transmitted to the access terminal using the signaling message. When the information is indirectly transmitted to the access terminal, the access network transmits the slotting rate and a MAC (Media Access Control) index to the access terminal, and the access terminal then determines the slotting start point and the pilot offset using the information from the access network.

As illustrated in FIG. 4, each user transmits the DRC channel and the pilot channel based on the assigned slotting rate, the slotting start point and the pilot offset information. More specifically, in FIG. 4, the channel-spread pilot and the channel-spread DRC are provided to a pilot signal offset part and a DRC signal gating part, respectively. The DRC signal gating part can be comprised of the switch 405, as shown in FIG. 4. The pilot signal offset part can be comprised of the switch 401 and the 64-chip delay 403 for delaying the pilot signal for a predetermined chip interval, as shown in FIG. 4. The switch 401 and the switch 405, under the control of the controller, control a transmission start point of the pilot signal and gate transmission of the DRC channel according to the information on the slotting rate, the slotting start point and the pilot offset, received from the access network, thereby to minimize interference between the DRC channels.

Figure 5:
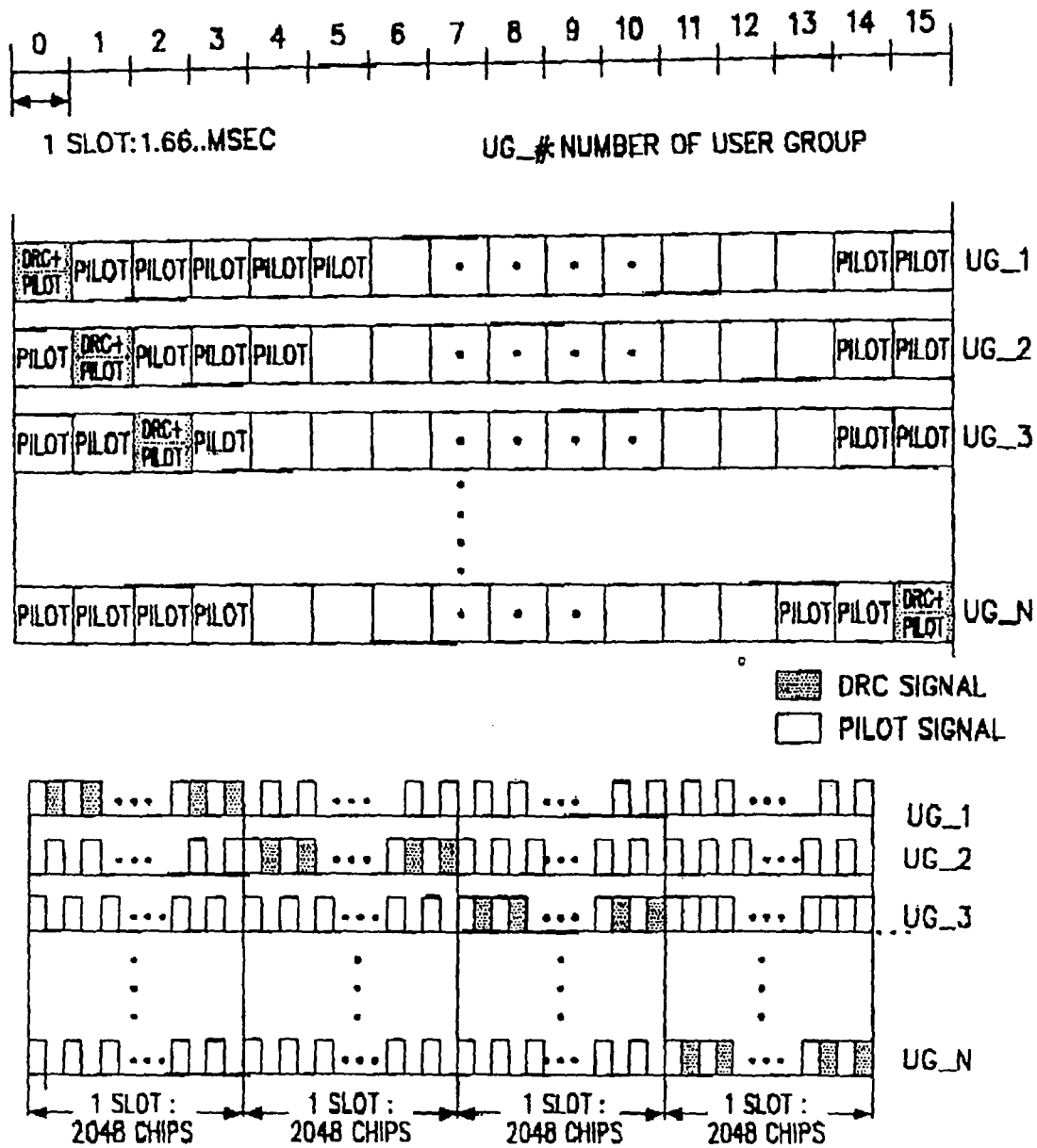
FIG. 5 is a diagram illustrating an operation of gating transmission of a DRC channel to the access network and applying an offset to user pilots before transmission in the HDR mobile communication system according to an embodiment of the present invention.
Figure 6:
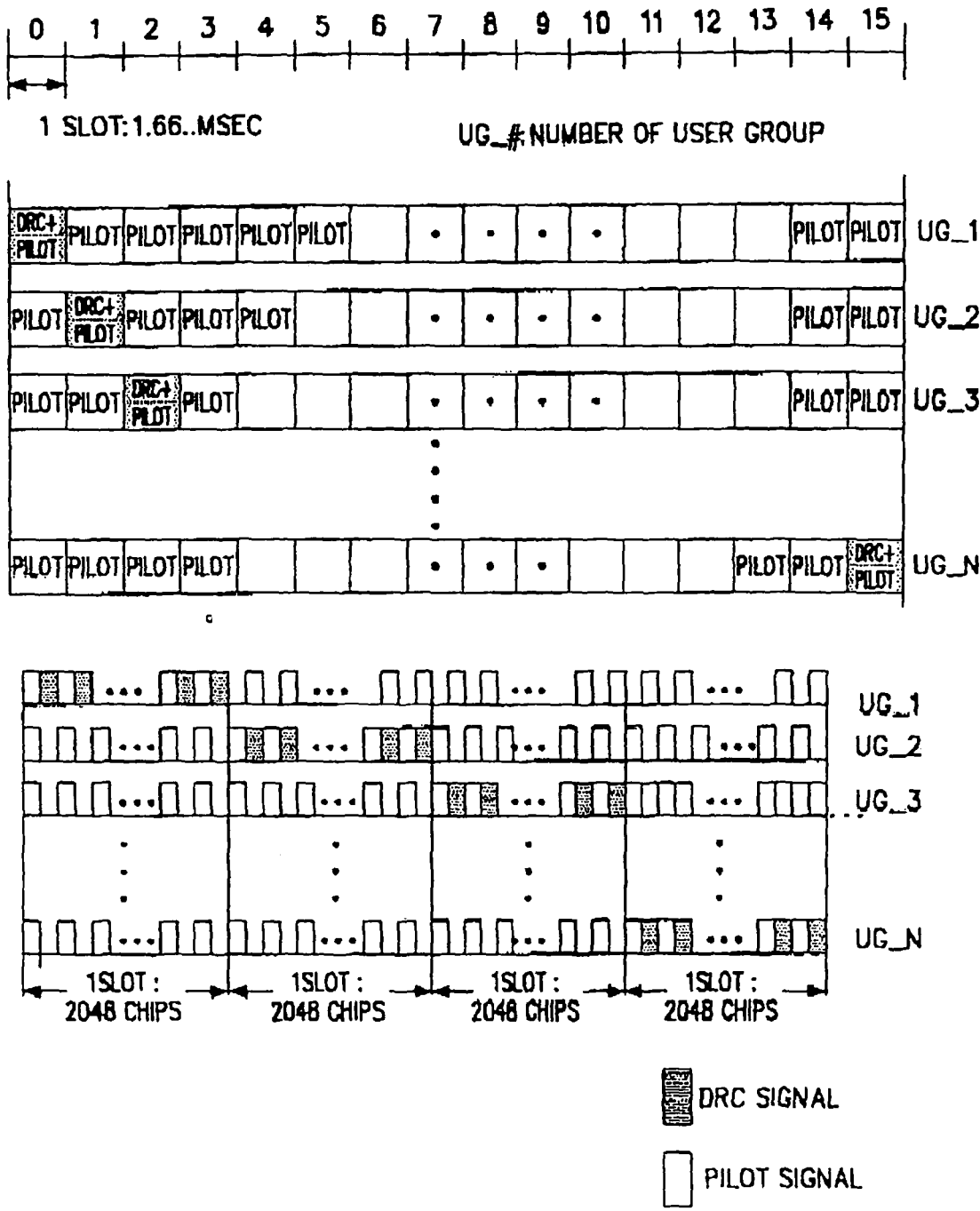
FIG. 6 is a diagram illustrating an operation of gating transmission of a DRC channel to the access network and applying no offset to user pilots before transmission in the HDR mobile communication system according to an embodiment of the present invention.

FIGS. 5 and 6 illustrate a method for continuously transmitting the pilot signal and gating transmission of the DRC channel according to an embodiment of the present invention. This method is divided into one method for transmitting the pilot signal with an offset and another method for transmitting the pilot signal with no offset. In the former case where the pilot signal has an offset, the users are grouped into a plurality of user groups and the DRC channels are gated such that they should be transmitted at different slots according to the user groups, as shown in FIG. 5. For example, a first user group UG_1 transmits the DRC channel at the first slot, and the second user group UG_2 transmits the DRC channel at the second slot. The DRC channels are transmitted at predetermined intervals determined according to the slotting rate. Since the user groups have different pilot signal transmission start points, the transmission power is uniformly distributed at the slot where the DRC channel is gated. When a specific user group is given a 64-chip pilot offset as shown in FIG. 5, it is possible to reduce interference between pilot signals from the users that transmit only the pilot signal but not the DRC channel.

FIG. 6 illustrates a method for gating transmission of a DRC channel and continuously transmitting a pilot signal with no offset. In this case, when the second user transmits the DRC channel, there occurs no interference between the DRC channel and another user's DRC channel as in FIG. 5.

Although FIGS. 5 and 6 show a case where the pilot signal and the DRC channel are subjected to time division multiplexing, the invention can also be applied to another case where the pilot signal and the DRC channel are subjected to code division multiplexing. That is, by gating transmission of the DRC channel, it is possible to reduce interference to the reverse link. When the pilot signal and the DRC channel are subjected to code division multiplexing, no offset is given to the continuous pilot signals.

Figure 7:
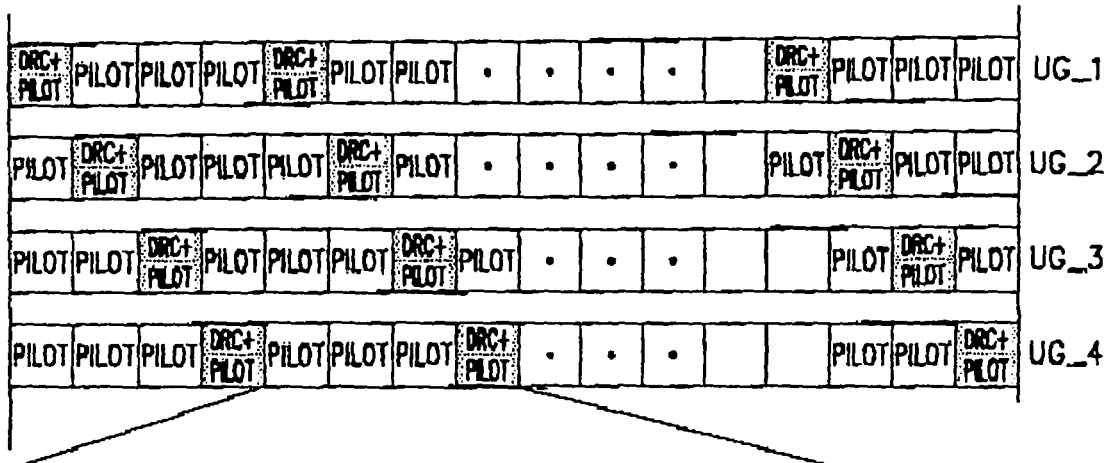
FIG. 7 is a diagram illustrating a method for transmitting DRC channels divided into 4 user groups and pilot signals having an offset in the HDR mobile communication system according to an embodiment of the present invention.
Figure 7:
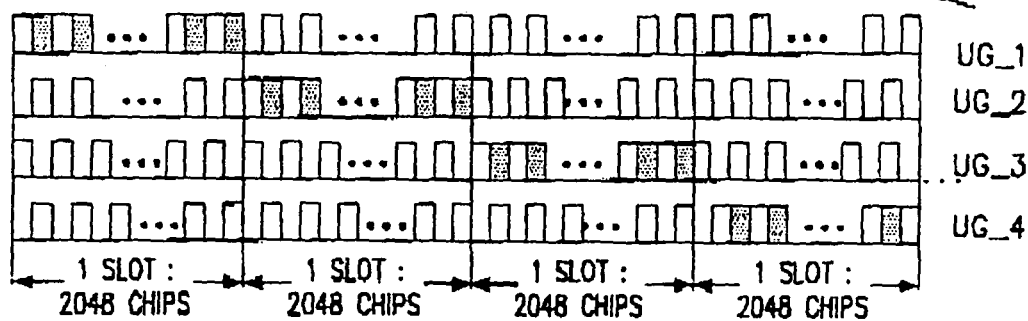
Figure 8:
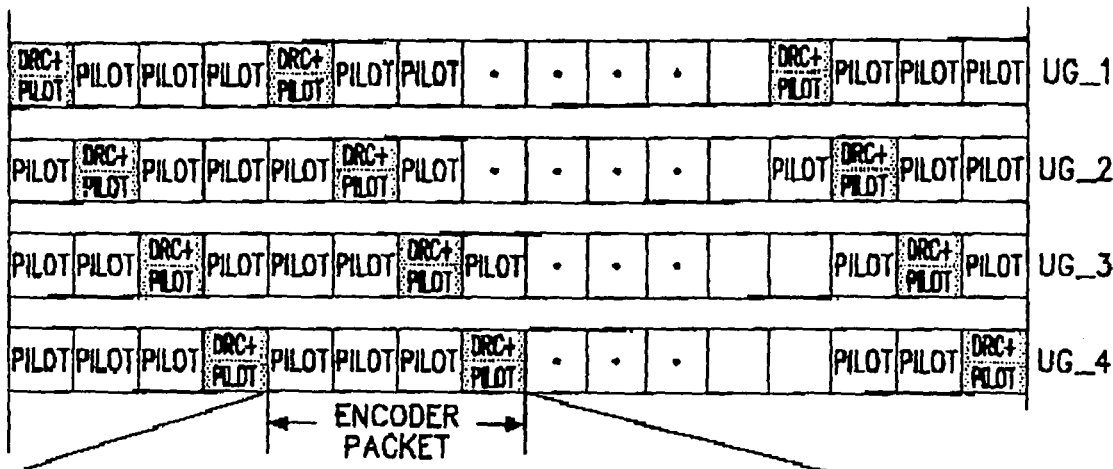
FIG. 8 is a diagram illustrating a method for transmitting DRC channels divided into 4 user groups and pilot signals having no offset in the HDR mobile communication system according to an embodiment of the present invention.
Figure 8:
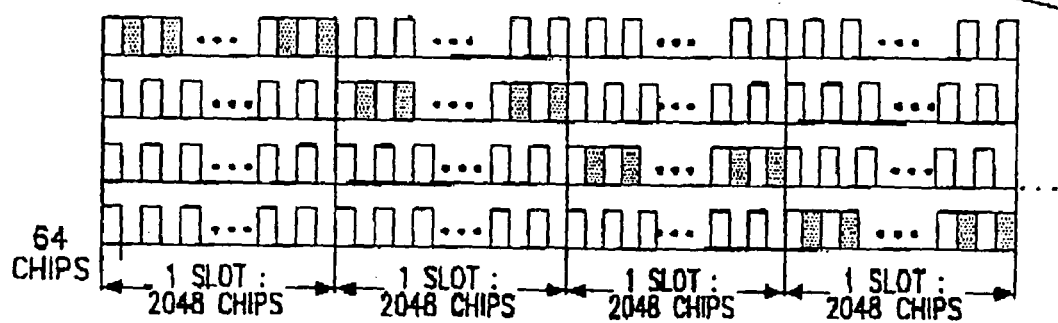

FIGS. 7 and 8 illustrate a method for gating transmission of the DRC channel at a slotting rate DRCSlotRate=¼ according to an embodiment of the present invention. Specifically, FIG. 7 shows one case where an offset is given to the pilot signals according to the user groups, and FIG. 8 shows another case where no offset is given to the pilot signals. When the slotting rate is ¼, the users are divided into 4 user groups. Each user is provided with the slotting rate ¼ and the slotting start point through a signaling message transmitted from the access network.

Referring to FIG. 7, the users in the first user group UG_1 are assigned the slotting rate ¼ and the slotting start point (1$^{st}$ slot) through the signaling message. Similarly, the users in the second user group UG_2 are also assigned the slotting rate ¼ and the slotting start point (2$^{nd}$ slot). In the same method, the users belonging to the third and fourth user groups UG_3 and UG_4 are also assigned the slotting rate ¼ and the 3$^{rd}$ and 4$^{th}$ slots as their slotting start points. The users gate transmission of the DRC channels to the access network at the designated periods beginning at their slotting start points according to the assigned slotting rate and slotting start points. In FIG. 3 above, the DRC is applied after a half slot. Therefore, if an encoded packet is comprised of 4 slots as shown in FIG. 7, the DRC is applied only to the first user group UG_1. Specifically, regarding the DRC application point of each user received at the access network, the DRC transmitted a half slot before one encoder packet is ended is applied. Therefore, when the slotting rate is ¼, only the first user group UG_1 transmits the DRC, a half slot before one encoder packet is ended. That is, the DRC applied to the data transmitted from the access network becomes the DRC transmitted by the first user group UG_1. Therefore, in order for the access network to schedule the DRC at every slot, it is preferable to determine a data rate of the forward link in consideration of the DRC of the user group applied at the corresponding slot and the latest DRC information of the previous user group during a period corresponding to the slotting rate before the corresponding slot.

Although FIG. 7 shows a case where the pilot signal and the DRC channel are subjected to time division multiplexing, the gated transmission can also be equally applied to another case where the pilot signal and the DRC channel are subjected to code division multiplexing. By gating transmission of the DRC channel, it is possible to reduce interference to the reverse link.

FIG. 8 illustrates a method for gating transmission of the DRC channels at a given slotting rate beginning at a given slotting start point according to the user groups and continuously transmitting the pilot signals with no offset, as described with reference to FIG. 7. When an offset is given to the pilot signal as shown in FIGS. 5 and 7, there occurs no interference with the pilot signals from the users in the other user groups. However, there exists interference with the users transmitting the DRC channels. When no offset is given to the pilot signal, the performance is the same as in the conventional HDR system except for the case where transmitting the DRC is gated. In this case, interference between the pilot signals may increase compared with the case where an offset is given to the pilot signals, but the interference may be reduced in an interval where the DRC is transmitted.

Although FIG. 8 shows a case where the pilot signal and the DRC channel are subjected to time division multiplexing, the gated transmission can also be equally applied to another case where the pilot signal and the DRC channel are subjected to code division multiplexing. By gating transmission of the DRC channel, it is possible to reduce interference to the reverse link.

In the gated DRC transmission method proposed by the present invention, when the capacity of the reverse link is exceeded (or saturated), each user gates transmission of the DRC channel, thereby to decrease interference between users and also decrease the capacity of the reverse link.

In the conventional HDR system, each access terminal (AT) transmits the DRC at every slot, as mentioned above, and the capacity of the reverse link is restricted. Therefore, if the number of users for the reverse link exceeds the capacity, a new access terminal (AT) cannot receive data over the forward link. Therefore, the access terminal (AT) must increase the capacity of the reverse link by switching from the continuous DRC transmission mode to the gated (or slotted) DRC transmission mode.

When the capacity of the reverse link exceeds a predetermined reference value, the access network (AN) must determine a ratio of a DRC power value to interference by the other access terminals (ATs). A threshold value for an error rate per frame of the DRC channel is defined as $DRC_{SER}$ and a signal-to-noise ratio corresponding to the threshold value $DRC_{SER}$ is defined as $E_b/N_{t_{Thresh}}$. Further, reception power of the access network (AN) before despreading by each access terminal (AT) is defined as $P_{w_i}$ (i=1, ..., N), the sum of received signal powers including noises before despreading by each access terminal (AT) is defined as $I_o$, and DRC power at the receiver of a certain access terminal (AT) is defined as $$E_{DRC_{R_x}^{U_t}}.$$

Therefore, in the process of detecting the DRC for the first user, the interference is represented by $I_o$-$P_{u_1}$. Therefore, a ratio of the DRC reception power $$E_{DRC_{R_x}^{U_t}}$$

to a value determined by subtracting the signal power $P_{u_1}$ from the interference $I_o$, including the noises, of the other access terminals is represented by Equation (1) below. Equation (1) represents a ratio of DRC power to total interference of a certain user.

$$\frac{E_{DRC}U_1}{N_t} = \frac{E_{DRC_{R_x}^0}}{I_o - P_{u_1}} \quad i = 1, \ldots, N \tag{1}$$

A method for determining a value for switching from the continuous DRC transmission mode to the gated DRC transmission mode, i.e., a standard signal-to-noise ratio $E_b/N_{t_{measure}}$ of a DRC signal using Equation (1), is divided into two methods: a first method defines an average ratio of the DRC reception power of each user to interference with other users as $E_b/N_{t_{measure}}$, and a second method defines the minimum ratio of the DRC reception power of each user to interference with other users as $E_b/N_{t_{measure}}$.

Figure 9:
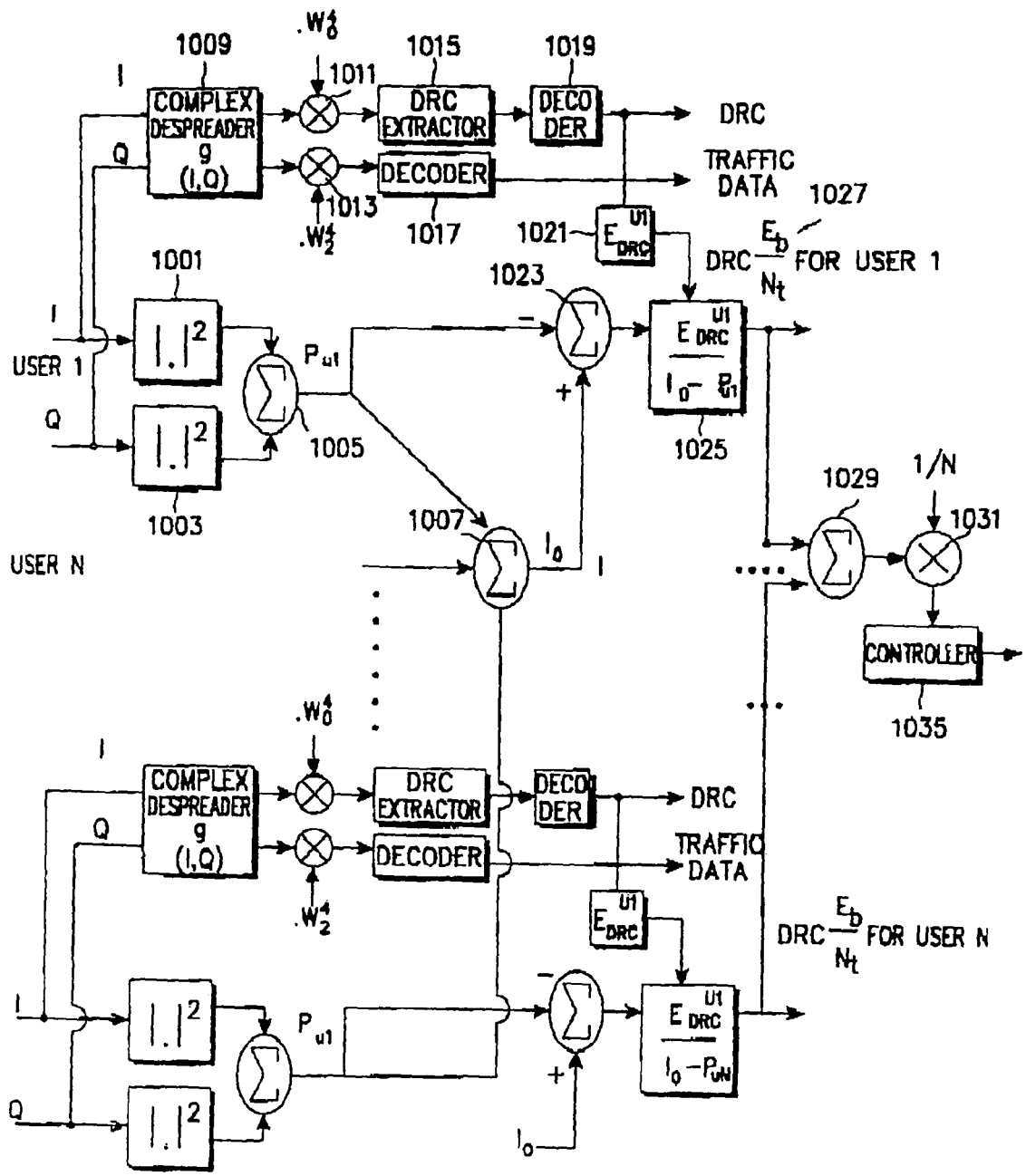
FIG. 9 is a diagram illustrating an example of an access network receiver in the HDR mobile communication system according to an embodiment of the present invention.
Figure 10:
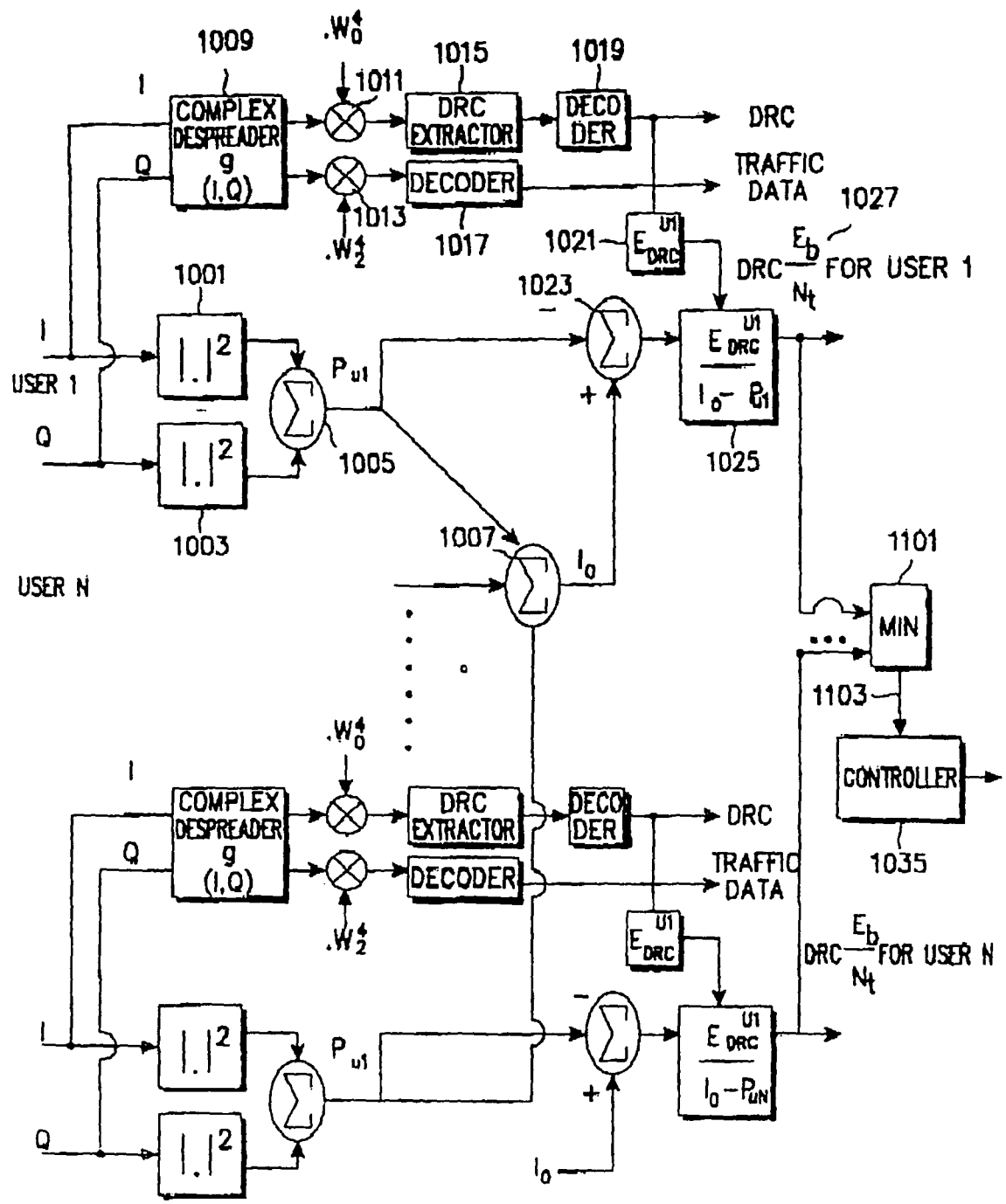
FIG. 10 is a diagram illustrating another example of an access network receiver in the HDR mobile communication system according to an embodiment of the present invention.

FIGS. 9 and 10 illustrate a structure of a reverse link receiver for determining the value $E_b/N_{t_{measure}}$ so as to switch to the gated DRC transmission mode when the capacity of the reverse link exceeds a predetermined reference value according to an embodiment of the present invention. Since every user has the same receiver structure, only the structure of the first user's receiver will be described below with reference to FIGS. 9 and 10.

The first method will be described with reference to FIG. 9. The access network receiver measures signal power $P_{w_1}$ received from the first user USER1 of the first access terminal AT1, using an I squarer 1001, a Q squarer 1003 and a summer 1005. In the same manner, the signal power $P_{w_N}$ from the other users is measured through the associated I squarer and Q squarer. The measured signal power is provided to a summer 1007 which measures the $I_o$ value by summing up the signal power from all users. A subtracter 1023 subtracts the $P_{w_1}$ from the $I_o$, thereby obtaining the value $I_o$-$P_{u_1}$ equivalent to a value determined by subtracting its signal power from the signal power of all users. The I squarer 1001, the Q squarer 1003, the summer 1005, the summer 1007 and the subtracter 1023 constitute a "power measurement part" for measuring interference between the access terminal and the other access terminals. In addition, the I and Q signals from the first user USER1 are provided to a complex despreader 1009 for complex despreading. A multiplier 1011 channel-despreads the complex-despread I signal by an orthogonal function $W_0^4$ of length 4, and a multiplier 1013 channel-despreads the complex-despread Q signal by an orthogonal function $W_2^4$ of length 4. The channel-despread I signal has the pilot signal, the DRC and the RRI. A DRC extractor 1015 extracts the DRC from the channel-despread I signal and provides the extracted DRC to a decoder 1019. The decoder 1019 decodes the DRC into the original DRC. A decoder 1017 decodes the channel-despread Q signal and outputs traffic data. A DRC measurer 1021 measures reception power $E_{DRC_4}$ of the DRC provided from the decoder 1019. A DRC $E_b/N_t$ measurer 1025 calculates a DRC $E_b/N_t$ for the first user USER1 by receiving the output value $I_o$-$P_{u_1}$ of the subtracter 1023 and the output value $E_{DRC_4}$ of the DRC measurer 1021. An average DRC $E_b/N_t$ measurement part for measuring an average $E_b/N_t$ (signal-to-noise ratio) of the DRC channels by receiving the signal-to-noise ratios of the DRC channels from all the users is comprised of a summer 1029 and a multiplier 1031 as shown in FIG. 9. The summer 1029 sums up $E_b/N_t$ of the DRC channels from the respective users, and the multiplier 1031 divides the summed signal by the number N of the users and outputs an average $E_b/N_t$ of the DRC channels. A controller 1035 compares the average $E_b/N_t$ of the DRC channels, output from the multiplier 1031, with a predetermined reference value in order to determine whether to gate the DRC channel and also to determine a corresponding slotting rate.

Next, the second method will be described below with reference to FIG. 10. The first method of FIG. 9 calculates the DRC $E_b/N_t$ (or DRC reception power) by averaging DRC $E_b/N_t$ values of the respective users, whereas the average DRC $E_b/N_t$ measurement part in the second method of FIG. 10 is comprised of a minimum value detector (MIN) 1101. The minimum value detector 1101 receives the DRC $E_b/N_t$ values of the respective users and outputs the minimum DRC $E_b/N_t$ value as $E_b/N_{t_{measure}}$. The controller 1035 then compares the minimum DRC $E_b/N_t$ output from the minimum value detector 1101 with the predetermined reference value to determine whether to gate the DRC channel and also to determine a corresponding slotting rate.

That is, the $E_b/N_{t_{measure}}$ value calculated by the method of FIG. 9 or 10 is provided to the controller 1035. The controller 1035 performs an operation of a slotting rate determining algorithm of FIG. 11 by receiving the $E_b/N_{t_{measure}}$ value.

Figure 11:
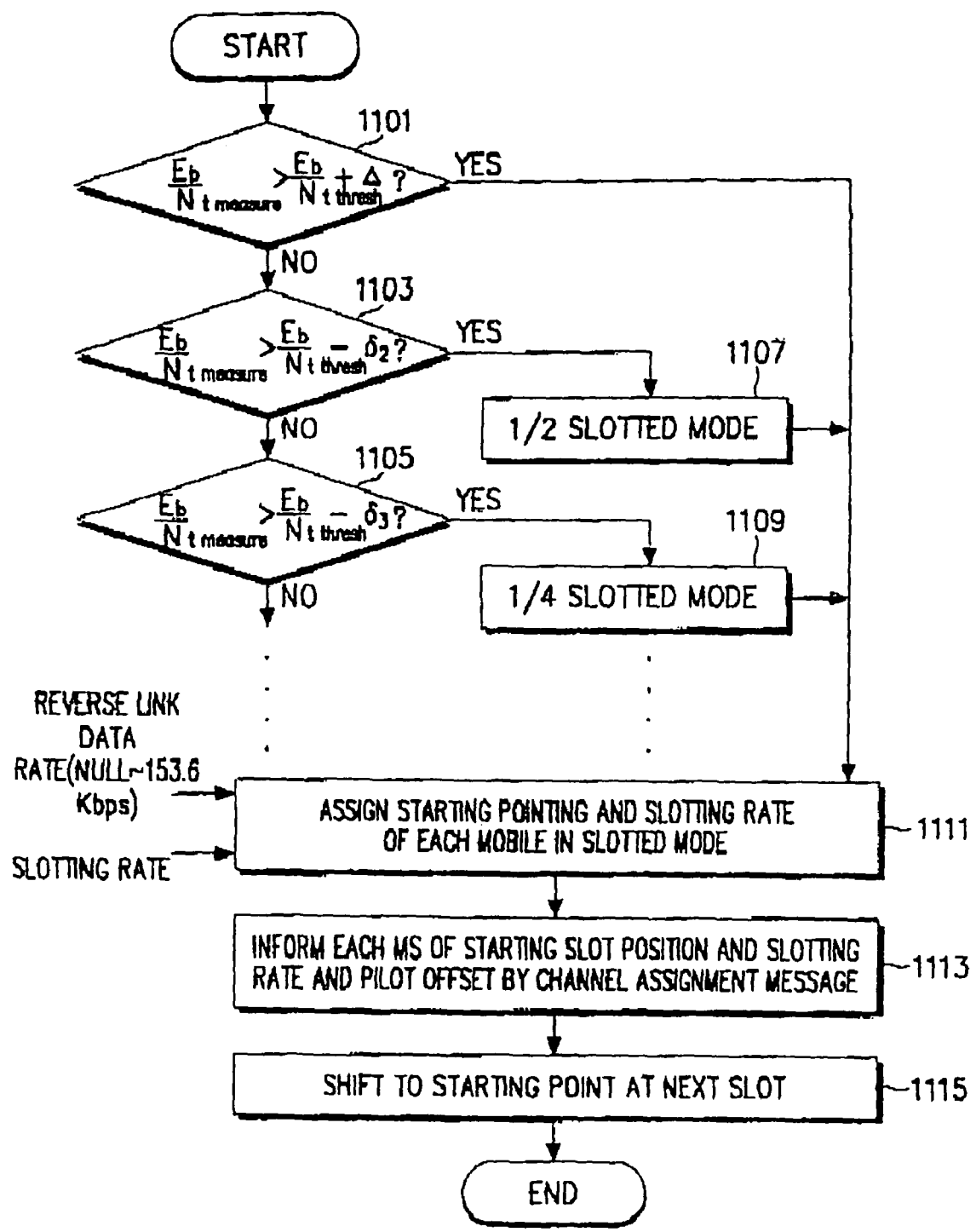
FIG. 11 is a flow chart illustrating a method for gating transmission of a DRC channel based on a received $$\frac{E_b}{N_{t_{measure}}}$$

FIG. 11 illustrates a procedure for determining a slotting rate of the DRC channel by measuring strength of a signal received from each user in the access network according to an embodiment of the present invention. Referring to FIG. 11, the controller 1035 of the access network (AN) receives the standard signal-to-noise ratio $E_b/N_{t_{measure}}$ of the DRC channel, calculated in FIG. 9 or 10. Thereafter, in step 1101, the controller 1035 compares the standard signal-to-noise ratio $E_b/N_{t_{measure}}$ of the DRC channel with $E_b/N_{t_{Thresh}}$+Δ. If $E_b/N_{t_{measure}}$ is larger than $E_b/N_{t_{Thresh}}$+Δ, the controller 1035 proceeds to step 1111, and otherwise, proceeds to step 1103. In step 1103, the controller 1035 compares $E_b/N_{t_{measure}}$ with $E_b/N_{t_{Thresh}}$-$\delta_2$. If $E_b/N_{t_{measure}}$ is larger than $E_b/N_{t_{Thresh}}$-$\delta_2$, the controller 1035 sets the slotting rate to ½ in step 1107. Otherwise, the controller 1035 proceeds to step 1105. In step 1105, the controller 1035 determines whether $E_b/N_{t_{measure}}$ is larger than $E_b/N_{t_{Thresh}}$-$\delta_3$. If $E_b/N_{t_{measure}}$ is larger than $E_b/N_{t_{Thresh}}$-$\delta_3$, the controller 1035 sets the slotting rate to ¼ in step 1109. If the condition of step 1105 is not satisfied, the controller 1035 repeatedly performs the same process while changing the error margin Δ. Herein, since one frame is comprised of 16 slots, the slotting rate can be set up to ¹⁄₁₆. For example, regarding a unit of data transmitted from the access terminal to the access network, the data is transmitted in a unit of encoder packet comprised of 32 slots. Since the access network is frame-synchronized with the access terminal, the possible maximum slotting rate is ¹⁄₁₆, and the slotting start point can also become one of 16 positions.

Δ, $\delta_2$ and $\delta_3$ indicate error margins. After determining the slotting rate through the above process, the controller 1035 determines in step 1111 the slotting rate, the slotting start point and the pilot offset for each access terminal using the reverse link data rate and slotting rate information received from the access terminal (AT). Further, the controller 1035 groups the DRCs of the reverse link according to the determined slotting rate. In step 1113, the controller 1035 creates a signaling message including the slotting rate, the slotting start point and the pilot offset, and transmits the created signaling message to the respective access terminals (ATs)

After transmitting the signaling message, the controller 1035 performs the above process again for the next slot in step 1115.

The signaling message has the following format. For example, the signaling message is realized using a reserved field of the existing traffic channel assignment message. That is, it is possible either to realize a DRC slotting control message using the previously defined message or to define a new message. The traffic channel assignment message has a format shown in Table 3 below.

TABLE 3

| Field | Length (bits) |
| --- | --- |
| MessageID | 8 |
| MessageSequence | 8 |
| ChannelIncluded | 1 |
| Channel | 0 or 32 |
| RABLength | 2 |
| DRCLength | 2 |
| NumPilots | 4 |
| PilotPN | 9 |
| SoftHandoff | 1 |
| MacIndex | 5 |
| DRCCover | 3 |
| DRCSlotMode | 1 |
| DRCSlotRate | 2 |
| DRCStarting_Point | 4 |
| Pilot_OFFset | 1 |

In the conventional traffic channel assignment message format of Table 3, the slotted DRC transmission mode field DRCSlotMode, the slotting rate field DRCSlotRate, the DRC slotting start point field DRCStarting_Point and the pilot offset field Pilot_OFFset are added for the slotted DRC transmission. Each field will be described below in detail.

DRCSlotMode field records whether to gate the reverse DRC channel.

DRCSlotMode='0' indicates the continuous DRC transmission mode
  DRCSlotMode='1' indicates the slotted DRC transmission mode DRCSlotRate field records a slotting rate of the reverse DRC channel.

DRCSlotRate='00' indicates a ½ slotting rate
  DRCSlotRate='01' indicates a ¼ slotting rate
  DRCSlotRate='10' indicates a ⅛ slotting rate
  DRCSlotRate='11' indicates a 1/16 slotting rate DRCStarting_Point field records a start slot where the DRC channel is first transmitted when the reverse DRC channel is subjected to slotted transmission.

DRCStarting_Point='0000' indicates the $1^{st}$ slot
  DRCStarting_Point='0001' indicates the $2^{nd}$ slot
  DRCStarting_Point='0010' indicates the $3^{rd}$ slot
  .
  .
  .
  DRCStarting_Point='1110' indicates the $15^{th}$ slot
  DRCStarting_Point='1111' indicates the $16^{th}$ slot Pilot_OFFset field records whether to apply an offset when transmitting the reverse pilot signal.

Pilot_OFFset='0' indicates that no offset is applied.
  Pilot_OFFset='1' indicates that an offset is applied.

Table 4 below shows the fields added for DRC slotting control in the existing channel assignment message. As shown in Table 4, it is also possible to transmit only the fields for DRC slotting control through the channel assignment message. That is, Table 4 shows a message format used when transmitting only the DRC slotting control message instead of retransmitting the channel assignment message. In Table 4, the MessageID field is used to identify the DRC slotting control message.

TABLE 4

| Field | Length (bits) |
| --- | --- |
| MessageID | 8 |
| MessageSequence | 8 |
| DRCSlotMode | 1 |
| RCSlotRate | 2 |
| RCStarting_Point | 4 |
| Pilot_OFFset | 1 |

The signaling messages of Tables 3 and 4 transmit DRCSlotMode='0' for the continuous DRC transmission mode, and DRCSlotMode='1' to switch to the slotted DRC transmission mode. In order to provide a service to a new subscriber, the DRCSlotMode field is set to '1'.

FIG. 12 illustrates a procedure for switching from the slotted DRC transmission mode of the reverse link to the continuous DRC transmission mode when the capacity of the reverse link is improved because of a decrease in the number of users, according to an embodiment of the present invention.

Referring to FIG. 12, the controller 1035 determines in step 1201 whether a condition of $$\frac{E_b}{N_{t_{measure}}} > \frac{E_b}{N_{t_{thresh}}} + \Delta + \delta_1$$

is satisfied. If the condition is satisfied, the controller 1035 switches from the slotted DRC transmission mode to the continuous DRC transmission mode in step 1203. Here, "$\delta_1$" indicates a margin of the boundary value where switching occurs from the slotted DRC transmission mode to the continuous DRC transmission mode.

After switching from the slotted DRC transmission mode to the continuous DRC transmission mode in step 1203, the controller 1035 informs the access terminal (AT) of the switching to the continuous DRC transmission mode through the channel assignment message of Table 3 or 4, in step 1205. However, if the condition is not satisfied in step 1201, the controller 1035 determines in step 1207 whether a condition of $$\frac{E_b}{N_{t_{measure}}} > \frac{E_b}{N_{t_{thresh}}} - \delta_2 + \delta_1 \frac{E_b}{N_{t_{measure}}} > \frac{E_b}{N_{t_{thresh}}} - \delta_2$$

is satisfied. If the condition is satisfied, the controller 1035 switches to a slotting rate=½ DRC transmission mode in step 1209. However, if the condition is not satisfied in step 1207, the controller 1035 switches to a slotting rate=¼ DRC transmission mode in step 1213. After the mode switching, the controller 1305 informs the access terminal of the switched transmission mode through the channel assignment message of Table 3 or 4 in step 1211. After steps 1205 and 1211, the controller 1035 performs the same process again for the next slot in step 1215. Meanwhile, upon receipt of the message of Table 3 or 4, the access terminal performs the procedure of FIG. 14.

For a better understanding of the invention, the process for switching from the continuous transmission mode to the slotted transmission mode and from the slotted transmission mode to the continuous transmission mode will be described in detail with reference to FIG. 13.

FIG. 13 illustrates boundary values for switching from the continuous DRC transmission mode to the slotted DRC transmission mode due to a decrease in the capacity of the reverse link, or from the slotted DRC transmission mode to the continuous DRC transmission mode due to an improvement in the capacity of the reverse link.

As illustrated, reference numeral 13-1 indicates variation of a DRC symbol error value according to $E_b/N_{t_{measure}}$, and reference numeral 13-3 indicates a boundary of $E_b/N_{t_{thresh}}$ corresponding to a preferable symbol error rate $DRC_{SER}$ at the access network. Reference numeral 13-2 indicates a boundary where the slotting rate is changed from ¼ to ½, and the DRC reception power corresponding to this boundary becomes $E_b/N_{t_{Thresh}} - \delta_2$. For example, if the $E_b/N_{t_{measure}}$ value measured at the access network is larger than $E_b/N_{t_{Thresh}} - \delta_2$ and smaller than $E_b/N_{t_{thresh}}$, the slotting rate is set to ½. However, if the measured $E_b/N_{t_{measure}}$ value is smaller than $E_b/N_{t_{Thresh}} - \delta_2$, the slotting rate is set to ¼. In this manner, it is possible to change the slotting rate according to the measured capacity of the reverse link.

Further, reference numeral 13-4 indicates a boundary for switching from the continuous DRC transmission mode to the slotted DRC transmission mode if the capacity of the reverse link is exceeded. The signal-to-noise ratio (or reception power) of the DRC channel corresponding to this boundary becomes $E_b/N_{t_{Thresh}} + \Delta$. That is, if $E_b/N_{t_{measure}}$ is smaller than $E_b/N_{t_{Thresh}} + \Delta$, switching from the continuous DRC transmission to the slotted DRC transmission mode takes place. In addition, reference numeral 13-5 indicates a boundary for switching back to the continuous DRC transmission mode if the capacity of the reverse link is less than a reference value in the slotted DRC transmission mode. The signal-to-noise ratio of the DRC channel corresponding to this boundary becomes $E_b/N_{t_{Thesh}} + \Delta + \delta_1$. In this case, if $E_b/N_{t_{measure}}$ is larger than $E_b/N_{t_{Thesh}} + \Delta + \delta_1$, switching to the continuous DRC transmission mode takes place.

As mentioned above, switching from the continuous DRC transmission mode to the slotted DRC transmission mode happens at the point where $E_b/N_{t_{measure}}$ is smaller than $E_b/N_{t_{Thresh}} + \Delta$. Further, in the slotted DRC transmission mode, if $E_b/N_{t_{measure}}$ is larger than $E_b/N_{t_{Thresh}} - \delta_2$ but smaller than $E_b/N_{t_{Thresh}} + \Delta$, the slotting rate is set to ½; if $E_b/N_{t_{measure}}$ is smaller than $E_b/N_{t_{Thresh}} - \delta_2 + \delta_1$ $E_b/N_{t_{Thresh}} - \delta_2$ the slotting rate is set to ¼. Here, $\delta_2$ indicates a margin for changing the slotting rate to ¼.

In addition, the point where switching takes place from the slotted DRC transmission mode back to the continuous DRC transmission mode because of an improvement in the capacity of the reverse link is as follows. In the case where $E_b/N_{t_{measure}}$ has a margin $\delta_1$ for increasing a data rate, if the number of the reverse link users is decreased improving the capacity of the reverse link while the user chooses the slotted transmission mode for the reverse link because $E_b/N_{t_{measure}}$ is measured to be smaller than $E_b/N_{t_{Thresh}} + \Delta + \delta_1$, switching takes place back to the continuous transmission mode. In this case, if $E_b/N_{t_{measure}}$ is larger than $E_b/N_{t_{Thresh}} + \Delta + \delta_1$, switching happens from the slotted DRC transmission mode to the continuous DRC transmission mode. Here, $\delta_1$ indicates a margin of the boundary value where switching occurs from the slotted DRC transmission mode to the continuous DRC transmission mode.

FIG. 14 illustrates a procedure for detecting a slotting rate of the DRC channel by analyzing a signaling message from the access network in the access terminal according to an embodiment of the present invention.

Referring to FIG. 14, upon receipt of a signaling message from the access network (AN) in step 1401, the access terminal (AT) detects, in step 1403, the slotted DRC transmission mode DRCSlotMode, the slotting start point DRCStarting_Point, the slotting rate DRCSlotRate and the pilot offset Pilot_OFFset from the received signaling message, or determines the slotting start point DRCStarting_Point and the pilot offset Pilot_OFFset using the slotted DRC transmission mode DRCSlotMode, the MAC index MacIndex and the slotting rate DRCSlotRate included in the channel assignment message. After detecting the above information, the access terminal (AT) further determines in step 1403 whether the DRC channel is subjected to the slotted transmission (DRCSlotMode=1), based on the slotted transmission mode information DRCSlotMode detected from the channel assignment message. If DRCSlotMode=1, the access terminal (AT) gates transmission of the DRC channel according to the detected slotting start point and slotting rate in step 1405. Thereafter, the access terminal (AT) determines in step 1407 whether to transmit the pilot signal with an offset (Pilot_OFFset=1), based on the pilot offset information Pilot_OFFset included in the channel assignment message. If the pilot signal has an offset (i.e., Pilot_OFFset=1), the access terminal (AT) transmits the pilot signal with an offset as shown in FIGS. 5 and 7, in step 1409. If DRCSlotMode≠1 in step 1403, or if Pilot_OFFset≠1 in step 1407 or after transmitting the pilot signal with an offset in step 1409, then the access terminal (AT) prepares to control the next slot in step 1411.

In the embodiment of the present invention, the reverse DRC channel is gated (or slotted) in order to improve DRC detection capability of the access network. As another method for reducing reverse interference due to the DRC channel, the HDR system transmits the same DRC channels over at least 2 consecutive slots at transmission power lower than that of the pilot channel. Hereinafter, a case where transmission output of the DRC channel is low will be described in detail.

FIG. 15 illustrates a method for repeatedly transmitting the same DRC channels in the HDR mobile communication system according to an embodiment of the present invention. As illustrated, the number of repeated slots is 4. Therefore, the access terminal (AT) transmits the same DRC channels over 4 slots according to the number of repeated slots, specified by the access network. At this moment, the DRC channel is transmitted at transmission power lower than that of the pilot signal. That is, the same DRC channels are transmitted over the 4 consecutive slots at 25% of the transmission power of the pilot channel, thereby reducing interference due to the DRC channel transmitted by the access terminals in the reverse link. The access network acquires one DRC channel having the same power as that of the reverse pilot channel by accumulating the DRC channels received at the 4 slots. That is, the acquired DRC channel has enough power required for demodulation.

Although FIG. 15 shows a case where the same DRC channels are transmitted at the 4 consecutive slots, the same method can also be applied to another case where the same DRC channels are transmitted at a predetermined number of consecutive slots. For example, the number of repeated slots can be 1, 2 or 4, as shown in Table 5 below. In addition, information on the number of consecutive slots where the same DRC information is transmitted and information on the transmission power for the DRC information are transmitted from the access network to the access terminal through the signaling message. Alternatively, the access network transmits information on the number of repeated slots, and the access terminal then determines the transmission power for the DRC information using the information received from the access network.

For example, if the repetition frequency of the same DRC channels is 4, the transmission power for each DRC channel is set to 25% of the transmission power of the pilot channel as shown in Table 5.

TABLE 5

| Number of Slots for Repeated Transmission of Same DRC Info | DRC Tx Power Compared with Pilot Tx Power |
|---|---|
| 1 | 100% |
| 2 | 50% |
| 4 | 25% |

The method for transmitting the same DRC channels at 2 or more consecutive slots at reduced transmission power can also be applied to the slotted DRC transmission mode described in the embodiment of the present invention. In this case, one or more of the same DRC channels are slotted, and transmission power for the non-slotted DRC channels is set to be equal to or lower than the transmission power for the pilot channel.

FIG. 16 illustrates a method for slotting at least one of the same DRC channels in the HDR mobile communication system which repeatedly transmits the same DRC channels according to an embodiment of the present invention. As illustrated, the number of repeated slots is 4. Therefore, the access terminal (AT) transmits the same DRC channels for a 4-slot interval. In this case, the access terminal slots the DRC channels at the even-numbered slots (i.e., $2^{nd}$ and $4^{th}$ slots), and transmits only the pilot channels at the odd-numbered slots. Further, the transmission power for the DRC channels transmitted at the odd-numbered slots (i.e., $1^{st}$ and $3^{rd}$ slots) is adjusted to be lower than the transmission power for the pilot channels. For example, the transmission power for the DRC channels is adjusted to 50% of the transmission power for the pilot channels. That is, the DRC channels of two slots out of the 4 consecutive slots transmitting the same DRC channels are slotted, and the DRC channels of the other two slots are transmitted at the transmission power lower than that of the pilot channels.

That is, in another embodiment of the present invention, when the capacity of the reverse link is exceeded, the access terminal transmits the same DRC channels at two or more consecutive slots at transmission power lower than that of the pilot channel. In order to repeatedly transmit the DRC channels to the access network, the access terminal should first know the number of slots where the same DRC channels are repeated, and the transmission power for the DRC channels. Information on the number of slots where the same DRC channels are repeated and information on the transmission power for the DRC channels are transmitted from the access network to the access terminal through the signaling message. Alternatively, the access network transmits information on the number of DRC-repeated slots, and the access terminal then determines the transmission power for the DRC channels using the information provided from the access network.

FIG. 17 illustrates a structure of a reverse link transmitter according to an embodiment of the present invention. Specifically, FIG. 17 illustrates an apparatus for decreasing transmission power of the DRC channels below the transmission power of the pilot channels, when transmitting the same DRC channels at two or more consecutive slots.

Figure 1:
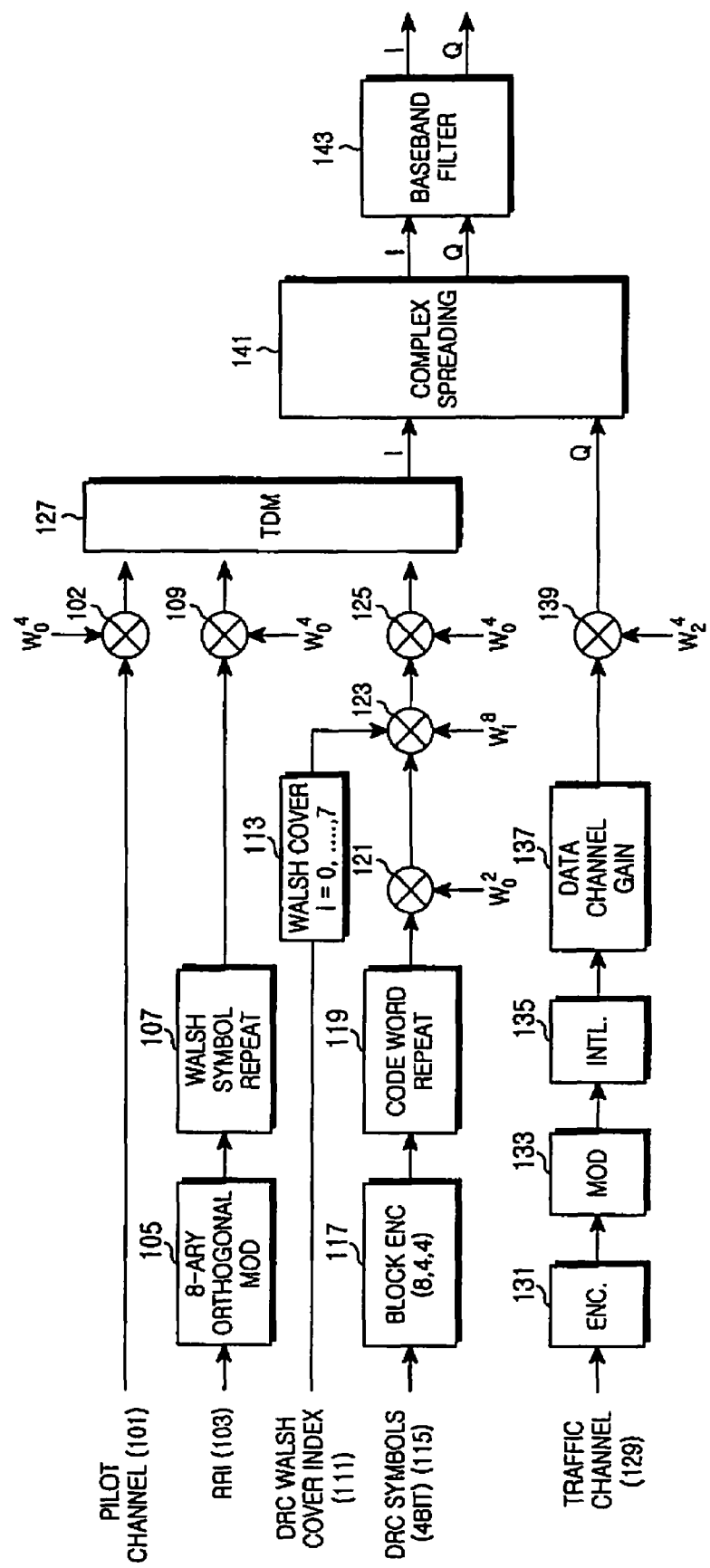
FIG. 1 is a diagram illustrating a structure of a reverse link in a general HDR mobile communication system.
Figure 2:
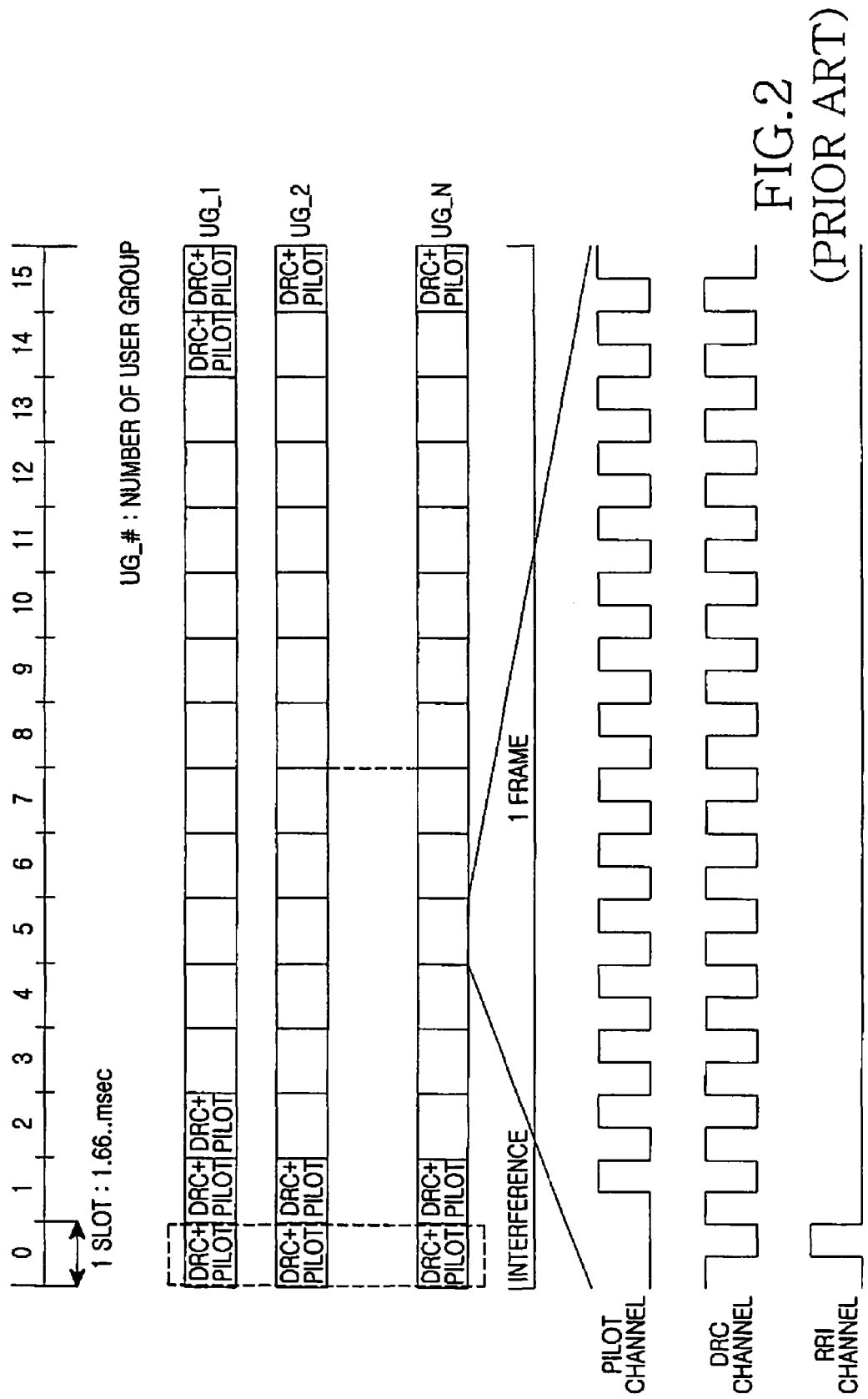
FIG. 2 is a diagram illustrating a method for transmitting a DRC channel in the general HDR mobile communication system.

As illustrated, the transmitter of FIG. 17 is similar in structure to the transmitter of FIG. 1, except for the structure of the DRC channel transmitter. Therefore, reference will be made only to the DRC channel transmitter in the following description.

A (8,4,4) block encoder 117 performs (8,4,4) block encoding on 4-bit DRC information. In this embodiment, the (8,4,4) block encoder 117 repeatedly encodes the same 4-bit DRC information a predetermined number of times under the control of the controller. A codeword repeater 119 repeats a codeword output from the (8,4,4) block encoder 117 a predetermined number of times. A multiplier 121 orthogonal-spreads the output of the codeword repeater 119 by multiplying it by a given Walsh code $W_0^2$ of length 2. A Walsh cover generator 113 outputs a Walsh cover by receiving a DRC Walsh cover index. A multiplier 123 multiplies the output of the multiplier 121 by the output of the Walsh cover generator 113. A DRC gain controller 1700 gain-controls the output of the multiplier 123. For example, when the same DRC channels are repeated 4 times in a 4-slot interval, the DRC gain controller 1700 adjusts the transmission power for the DRC channels to 25% of the transmission power for the pilot channel. A multiplier 125 multiplies the output of the DRC gain controller 1700 by a predetermined orthogonal code $W_0^4$, and outputs a DRC channel signal. In order to switch from the repeated transmission mode to the slotted transmission mode, i.e., in order to support a transmission method of FIG. 21 which will be described later, a gating device (switch 405 of FIG. 4) can be provided between the DRC gain controller 1700 and the multiplier 125. Upon receipt of an order to switch from the current repeated transmission mode to the slotted transmission mode from the access network, the access terminal slots at least one of the repeated DRC channels by controlling the gating device. Further, the access terminal also readjusts a gain of the DRC channel signal using the DRC gain controller 1700. That is, the access terminal adjusts the gain of the DRC channel signals, so that the transmission power determined by accumulating the same DRC channel signals at the access network should be equal to the transmission power of the pilot channel.

As described above, each user transmits the DRC channels and the pilot signals based on the information on the number of DRC-repeated slots and the information on the transmission power for the DRC channels, that is, the information being provided from the access network. The channel-spread DRC channel signal is provided to the DRC gain controller 1700. The DRC gain controller 1700 controls transmission power of the DRC channels based on the DRC information transmission power determined depending upon the number of slots where the same DRC information is repeated. By controlling the transmission power of the DRC channels in this manner, it is possible to reduce interference between the DRC channels from the users.

Even in the method for transmitting the same DRC channels at two or more consecutive slots at transmission power lower than that of the pilot channel, it is possible to reduce interference between pilot signals using the pilot offset in the reverse link. In this case, whether to set the pilot offset can be directly informed to the access terminal using a predetermined field of the signaling message, or can be indirectly determined at the access terminal using the MAC index assigned by the access network. For example, the pilot offset is set according to whether the MAC index is an even number or an odd number.

FIG. 18 illustrates a procedure for switching from the existing continuous DRC transmission mode to a transmission mode for transmitting the same DRC channels over at least 2 consecutive slots at transmission power lower than that of the pilot channel, when a value calculated by the access network by measuring a signal transmitted from each user exceeds a capacity of the reverse link according to an embodiment of the present invention.

Referring to FIG. 18, the access network (AN) compares the value $E_b/N_{t_{measure}}$ measured in FIG. 9 or 10 with $E_b/N_{t_{thresh}}+\Delta$ in step 1801. If $E_b/N_{t_{measure}}$ is larger than $E_b/N_{t_{Thresh}}+\Delta$, the access network proceeds to step 1811, and otherwise, proceeds to step 1803. The access network compares $E_b/N_{t_{measure}}$ with $E_b/N_{t_{thresh}}-\delta_2$ in step 1803. If $E_b/N_{t_{measure}}$ is larger than $E_b/N_{t_{thresh}}-\delta_2$, the access network determines to repeatedly transmit the reverse DRC channels two times at 50% transmission power of the pilot channel in step 1807, and then proceeds to step 1811. Otherwise, the access network proceeds to step 1805. The access network compares $E_b/N_{t_{measure}}$ with $E_b/N_{t_{thresh}}-\delta_3$ in step 1805. If $E_b/N_{t_{measure}}$ is larger than $E_b/N_{t_{thresh}}-\delta_3$, the access network determines to repeatedly transmit the DRC channels four times at 25% transmission power of the pilot channel in step 1809, and then proceeds to step 1811. That is, if the repetition frequency of the same DRC is N, the transmission power of the DRC channels becomes 1/N times the transmission power of the pilot channel. Here, $\Delta$, $\delta_2$ and $\delta_3$ indicate error margins. After determining the repetition frequency of the DRC channel and the transmission power in this manner, the access network assigns a decoder according to the determined repetition frequency of the DRC channel and the determined transmission power in step 1811. Thereafter, in step 1813, the access network transmits to the access terminal (AT) the signaling message including the determined DRC repetition frequency and transmission power information. Subsequently, the access network collects the received DRC channels according to the repetition frequency and then determines reception power of the DRC channels in step 1815.

In FIGS. 15 to 18, the DRC repetition frequency and the DRC transmission power are determined after measurement of interference to the reverse link. Alternatively, however, it is also possible to reduce interference to the reverse link by decreasing transmission power of the DRC channels below the transmission power of the pilot channel, if the same DRC channels are transmitted at the consecutive slots before application of the above method. That is, when the DRC repetition frequency. DRCLength is 2 or 4, it is possible to reduce interference to the reverse link by decreasing the transmission power of the DRC channels below the transmission power of the pilot channel. For example, before application of the method for transmitting the same DRC channels over at least 2 consecutive slots at decreased DRC transmission power, if the same DRC channels have been previously transmitted in an N-consecutive slot interval, it is possible to reduce interference to the reverse link by decreasing the transmission power of the DRC channels to 1/N times the transmission power of the pilot channel. In other words, when the DRC channels are repeatedly transmitted at the same transmission power as that of the pilot channel, the transmission power of the DRC channels can be adjusted to be lower than that of the pilot channel through the signaling message during transmission. In addition, during repeated DRC transmission, the access network can also send a slotted transmission order to the access terminal through the signaling message. For example, if the reverse interference increases to exceed a threshold value during the repeated DRC transmission, the access network may order the access terminal to slot transmission of the DRC channels. In this case, the access terminal determines the slotting rate DRCSlotRate by inverting the repetition frequency DRCLength of the DRC channel assigned by the access network during call setup. A method for controlling the slotted DRC transmission using the DRC repetition frequency DRCLength will be described below.

FIG. 19 illustrates a procedure for informing the access terminal of a slotting rate through the signaling message in the access network according to an embodiment of the present invention. Referring to FIG. 19, the access network determines the DRC repetition frequency DRCLength and also determines the slotting rate DRCSlotRate by inverting the DRC repetition frequency DRCLength in step 1901. The slotting rate DRCSlotRate is equal to a reciprocal of the DRC repetition frequency DRCLength. Table 6 below shows the slotting rates DRCSlotRate associated with the repetition frequencies DRCLength indicating the number of the slots where the same DRC information is repeatedly transmitted.

TABLE 6

| DRCLength | DRCSlotRate |
|---|---|
| 1 | 1 |
| 2 | ½ |
| 4 | ¼ |

Thereafter, in step 1903, the access network creates a signaling message including the MAC index (MacIndex), the slotted transmission mode DRCSlotMode (continuous transmission mode or slotted transmission mode) and the slotting rate DRCSlotRate (or DRCLength) of the respective access terminals. In step 1905, the access network transmits the created signaling message to the access terminal.

FIG. 20 illustrates a procedure for determining the slotting rate and the slotting start point for slotted transmission of the reverse DRC channels using the information included in the received signaling message in the access terminal. The signaling message including the MAC index MacIndex and the DRC repetition frequency DRCLength is transmitted to the access terminal during an initial access to the system. While repeatedly transmitting the DRC channels according to the DRC repetition frequency included in the signaling message, upon receipt of a slotted transmission order from the access network, the access terminal performs slotted DRC transmission according to the slotting rate DRCSlotRate determined by inverting the DRC repetition frequency DRCLength.

Referring to FIG. 20, the access terminal receives the signaling message including the MAC index MacIndex and the DRC repetition frequency DRCLength from the access network in step 2001. When receiving the DRC repetition frequency DRCLength, the access terminal determines the slotting rate DRCSlotRate by inverting the DRC repetition frequency DRCLength. However, when the slotting rate DRCSlotRate is received, the access terminal determines the DRC repetition frequency DRCLength by inverting the slotting rate DRCSlotRate. That is, the access network is required to provide the access terminal with any one of the slotting rate DRCSlotRate and the DRC repetition frequency DRCLength. Thereafter, in step 2003, the access terminal calculates a slotting period using the determined slotting rate DRCSlotRate. The slotting period is a reciprocal of the slotting rate DRCSlotRate. Therefore, the DRC repetition frequency has the same value as the slotting period. In step 2005, the access terminal calculates an index value which is equivalent to a remainder obtained by dividing the assigned MAC index (or DRC cover index) by the slotting period. The access terminal determines in step 2007 whether the determined index value is '0'. If the index value is '0', the access terminal determines the slotting start point DRCStarting_Point of the DRC channels undergoing the slotted transmission as a starting slot of one frame in step 2009. Otherwise, the access terminal determines in step 2011 whether the index value is '1'. If the index value is '1', the access terminal determines the slotting start point DRCStarting_Point of the DRC channels undergoing the slotted transmission as a second slot of one frame in step 2013. After repeating such a process, the access terminal determines in step 2015 whether the index value is 'N−2'. If the index value is 'N−2', the access terminal determines the slotting start point DRCStarting_Point of the DRC channels undergoing the slotted transmission as an $(N-1)^{th}$ slot of one frame in step 2019. Otherwise, the access terminal determines the slotting start point as an $N^{th}$ slot of one frame in step 2017. For example, when the slotting rate is ¼ (DRCSlotRate=¼), the slotting period becomes 4 (=1/DRCSlotRate), and when the access terminal is assigned an MAC index of 27, it starts to transmit the DRC channels, after a lapse of 3 slots from the starting point of one frame.

In FIGS. 19 and 20, the slotted transmission mode is applied to the case where the same DRC channels are repeatedly transmitted at two or more consecutive slots. However, even in the continuous DRC transmission mode, the access network determines the slotting rate by measuring interference of the reverse link through the processes of FIGS. 9 and 10 and provides the determined slotting rate information to the access terminal, and the access terminal then calculates the starting slot of one frame for the slotted DRC transmission by performing the steps 2001 to 2019 of FIG. 20.

Although FIG. 20 shows how the access terminal determines the starting slot of the DRC channel within one frame, it is also possible to determine whether to set a pilot offset using the same method. In this case, an offset is set up to the pilot according to whether a remainder obtained by dividing the MAC index assigned to the access terminal by the slotting period is an odd number or an even number. Besides, it is also possible to decide whether to set up the pilot offset according to whether the remainder obtained by dividing the MAC index assigned to the access terminal by the slotting period is larger than a threshold value. For example, for the slotting rate DRCSlotRate=¼, if the remainder is smaller than 2, the pilot offset is set up. Otherwise, if the remainder is larger than or equal to 2, the pilot offset is not set up.

Although the invention has been described with reference to an embodiment where the access terminal determines the DRC slotting start point DRCStarting_Point and whether to set up the pilot offset Pilot_OFFset using the DRC slotting rate DRCSlotRate and the MAC index MacIndex, it is also possible for the access network to determine the DRC slotting rate and the MAC index and transmit them to the access terminal using the signaling message. In this case, the access network measures power levels of the interference signals generated by the respective user groups out of received reverse signals, determines the DRC transmission start point such that the DRC slotting start point DRCStarting_Point and the MAC index MacIndex should belong to the user group generating the least interference power, and transmits this information to the access terminal through the signaling message. In this case, whether to set up an offset to the pilot channel can be determined according to the DRC slotting start point DRCStarting_Point or the user group to which the access terminal belongs. In addition to the method where the access network determines the DRC transmission start slot DRCStarting_Point and the pilot offset Pilot_OFFset and transmits them to the access terminal, the access network may also calculate the number of users in the received user groups and then transmit the DRC transmission start slot and the pilot offset of the user group having the least number of users to the access terminal.

FIG. 21 illustrates a DRC information application start point in the transmission method in which the DRCLength=4 slotted transmission mode is applied according to an embodiment of the present invention. In this case, the DRC information is applied to the forward link, a half slot after the DRC information of every user group is received at the access network. That is, the access network applies the DRC information to the forward link after receiving the DRC information belonging to every user group, transmitted in the same slotting interval (4 slots). Although FIG. 21 shows a case where the access network applies the DRC information to the forward link after receiving the DRC information of every user group, transmitted in the same slotting interval (4 slots), the access network may also determine the data rate of the forward link using the last received DRC information of the respective user groups before receiving the DRC information of every user group, transmitted in the same slotting interval (4 slots).

Although FIG. 21 illustrates an application of the slotted transmission mode for the case where the same DRC information is repeated 4 times (DRCLength=4), the slotted transmission mode can also be applied even when the same DRC information is repeated N times. When the repetition frequency is DRCLength=N, the slotting rate becomes DRCSlotRate=1/N and the access network applies the DRC information to the forward link after receiving the entire DRC information transmitted in the same slotting interval (N slots). Even in this case, it is possible to reduce interference to the reverse link by applying the pilot offset in the same method.

FIG. 22 illustrates a DRC information application start point in the transmission method to which a DRCLength=2 slotted transmission mode according to an embodiment of the present invention. In this case, the DRC information is applied to the forward link, a half slot after the DRC information of every user group is received at the access network. That is, the access network applies the DRC information to the forward link after receiving the DRC information belonging to every user group, transmitted in the same slotting interval (2 slots). Although FIG. 22 shows a case where the access network applies the DRC information to the forward link after receiving the DRC information of every user group, transmitted in the same slotting interval (2 slots), the access network may also determine the data rate of the forward link using the last received DRC information of the respective user groups before receiving the DRC information of every user group, transmitted in the same slotting interval (2 slots).

FIG. 23 illustrates a method in which the access network receiver applies the DRC information to the forward link at a given point in the slotting interval before receiving the DRC information of every user group corresponding to the same slotting interval (4 slots) according to an embodiment of the present invention. When the DRC channels are subjected to the slotted transmission, the access network may receive the DRC information or may not receive the DRC information at a certain time point. For the non-received DRC information of the user group, the access network determines the data rate of the forward link using the last received DRC information. In this state, the access network has received only the DRC information from the first and second user groups UG1 and UG2 in the access terminal's DRC slotting interval n+1, but has not received the DRC information from the third and fourth user groups UG3 and UG4 in the slotting interval n+1. In this case, the access network determines the data rate of the forward link using the last received DRC information, i.e., the DRC information in the slotting interval n. That is, the access network selects the access terminal expected to receive the forward data by comparing the DRC information from the user groups UG3 and UG4, received in the $n^{th}$ interval, with the DRC information from the user groups UG1 and UG2, received in the $(n+1)^{th}$ interval, and then transmits the data to the selected access terminal at the determined data rate.

Although FIG. 23 shows a case where the access network fails to receive the DRC information from the third and fourth user groups UG3 and UG4, the invention can also be equally applied to the case where the access network fails to receive the DRC information from other user groups. In addition, the invention can also be applied to the case where the number of user groups is not 4.

While the invention has been described with reference to an embodiment where the pilot signals and the DRC channels are subjected to the time division multiplexing, the invention can also be applied to the case where the pilot signals and the DRC channels are subjected to the code division multiplexing.

FIG. 24 illustrates an example of the slotted transmission mode for the case where the pilot signal and the DRC channel are subjected to code division multiplexing according to an embodiment of the present invention. Specifically, FIG. 24 illustrates a transmission method to which the DRCSlotRate=¼ slotted transmission mode where the same DRC information is repeated 4 times (DRCLength=4). In this case, since the pilot signal and the DRC channel are subjected to code division multiplexing, it is not necessary to allocate an offset to the pilot signal. Therefore, when the slotted transmission mode is applied, the access terminal continuously transmits the DRC channels without time division multiplexing with the pilot channels, using all of the 2048 chips at the slot assigned to the access terminal itself. Slotting which one of the four slots having the same information is determined using the signaling message transmitted from the access network.

FIG. 25 illustrates a structure of a reverse link transmitter for transmitting the pilot signal and the DRC channel on a code division multiplexing basis according to an embodiment of the present invention.

Referring to FIG. 25, an orthogonal Walsh modulator 2601 performs n-ary orthogonal modulation on a reverse rate indicator (RRI) and outputs a symbol. A symbol repeater (or codeword repeater) 2602 repeats the symbol output from the orthogonal Walsh modulator 2601 a predetermined number of times. A time division multiplexer (TDM) 2603 time-multiplexes the output of the symbol repeater 2602 with pilot data of all 0's (or all 1's) according to a predetermined rule. A signal point mapper 2604 maps the data output from the time division multiplexer 2603 into +1 or −1. A multiplier 2605 orthogonal-spreads the output of the signal point mapper 2604 by multiplying it by a predetermined Walsh code $W_0^{16}$. A gain controller 2606, under the control of the controller, gain-controls the output of the multiplier 2605.

A biorthogonal encoder 2607 performs biorthogonal encoding on input DRC information. A codeword repeater 2608 repeats a codeword output from the biorthogonal encoder 2607 a predetermined number of times. A signal point mapper 2609 maps the data output from the codeword repeater 2608 into +1 or −1. A Walsh cover generator 2614 outputs a Walsh cover for sector division by receiving a DRC Walsh cover index. A multiplier 2610 multiplies the output of the signal point mapper 2609 by the output of the Walsh cover generator 2614. A multiplier 2611 orthogonal-spreads the output of the multiplier 2610 by multiplying it by a predetermined orthogonal code $W_0^{16}$. A switch 2612, under the control of the controller, gates the output of the multiplier 2611.

A gain controller 2613, gain-controls the output of the switch 2612. A summer 2615 sums up the outputs of the gain controllers 2606 and 2613.

A bit repeater 2616 repeats ACK (acknowledge) channel data a predetermined number of times. A signal point mapper 2617 maps the data output from the bit repeater 2616 into +1 or −1. A multiplier 2618 orthogonal-spreads the signal output from the signal point mapper 2617 by multiplying it by a predetermined orthogonal code. A gain controller 2619, gain-controls the output of the multiplier 2618.

An encoder 2620 encodes input traffic data, and a channel interleaver 2621 interleaves the output of the channel encoder 2620. An interleaved packet repeater 2622 repeats the interleaved packet data output from the channel interleaver 2621 a predetermined number of times. A signal point mapper 2623 maps the data output from the interleaved packet repeater 2622 into +1 or −1. A multiplier 2624 orthogonal-spreads the signal output from the signal point mapper 2623 by multiplying it by a predetermined orthogonal code. $W_2^4$ A gain controller 2625 controls a gain of the signal output from the multiplier 2624. A summer 2626 sums up the outputs of the gain controllers 2619 and 2625. An HPSK modulator 2627 performs HSPK modulation the outputs of the summers 2615 and 2626. A filter 2628 baseband-filters the output of the HPSK modulator 2627. The filtered signal is converted to an RF signal by frequency-up-conversion and then transmitted to the access network.

FIG. 26 illustrates a structure of a forward link transmitter according to an embodiment of the present invention. The transmitter is comprised of a traffic channel transmitter, a preamble transmitter, a MAC channel transmitter and a pilot channel transmitter.

First, with regard to the traffic channel transmitter, an encoder 2701 encodes forward traffic channel data. For example, a convolutional encoder or a turbo encoder having a code rate R=⅓ or ⅕ is typically used for the encoder 2701. A scrambling code generator 2702 generates a scrambling code for scrambling the traffic data, and a scrambler 2703 scrambles the output of the encoder 2701 by XORing it with the output of the scrambling code generator 2702. A channel interleaver 2704 interleaves the output of the scrambler 2703. A modulator 2705 modulates the output of the channel interleaver 2704 and outputs an interleaved symbol. The modulator 2705 serves as a QPSK (Quadrature Phase Shift Keying) modulator, an 8-PSK (8-Phase Shift Keying) modulator or a 16-QAM (16-Quadrature Amplitude Modulation) modulator. A symbol repeater 2706 repeats the output of the modulator 2705 a predetermined number of times. A symbol demultiplexer (DEMUX) 2707 demultiplexes the output of the symbol repeater 2706 to N available Walsh code channels. A 16-ary Walsh cover generator 2708 orthogonal-spreads the N outputs of the symbol demultiplexer 2707. A Walsh channel gain controller 2709 gain-controls the outputs of the 16-ary Walsh cover generator 2708. A Walsh chip level summer 2710 sums up the outputs of the Walsh channel gain controller 2709 on a chip level. Various signal information (slotting rate information, repetition frequency information, slotting start point information, pilot offset information and MAC ID (identification)) and user data mentioned herein are transmitted to the access terminal through the traffic channel transmitter. That is, the signaling message defined herein is transmitted through the traffic channel transmitter.

Next, regarding the preamble transmitter, a signal point mapper 2711 maps preamble data of all 0's to +1 or −1. A multiplier 2712 orthogonal-spreads the output of the signal point mapper 2711 by multiplying it by a specific 64-ary biorthogonal Walsh code (or sequence) associated with a user's unit MAC ID (or MAC index).

Next regarding the MAC channel transmitter, a signal point mapper 2713 maps 1-bit RPC (Reverse Power Control) information to +1 or −1. A PRC Walsh channel gain controller 2714 gain-controls the output of the signal point mapper 2713. A multiplier 2715 orthogonal-spreads the output of the PRC Walsh channel gain controller 2714 by multiplying it by a predetermined orthogonal code associated with the user's unique MAC ID. A bit repeater 2716 repeats 1-bit RAB information predetermined times. A signal point mapper 2717 maps the output of the bit repeater 2716 to +1 or −1. A multiplier 2718 orthogonal-spreads the output of the signal point mapper 2717 by multiplying it by a predetermined orthogonal code. A Walsh chip level summer 2719 sumps up the outputs of the multipliers 2715 and 2718 on a chip level. A sequence repeater 2720 repeats the sequence output from the Walsh chip level summer 2719 a predetermined number of times.

Next, with regard to the pilot channel transmitter, a signal point mapper 2721 maps pilot channel data of all 0's to +1 or −1. A multiplier 2722 orthogonal-spreads the output of the signal point mapper 2721 by multiplying it by a predetermined Walsh code.

A time division multiplexer (TDM) 2729 time-division-multiplexes the outputs of the traffic channel transmitter, the preamble transmitter, the MAC channel transmitter and the pilot channel transmitter according to a predetermined rule. A quadrature spreader 2723 complex-spreads the output of the time division multiplexer 2729 by multiplying it by a given PN code. Baseband filters 2724 and 2725 baseband-filter the I-component signal and the Q-component signal output from the quadrature spreader 2723, respectively. For RF modulation, modulators 2726 and 2727 multiply the outputs of their associated baseband filters 2724 and 2725 by a carrier signal. A summer 2728 sums up the outputs of the modulators 2726 and 2727, and forwards the modulated signal to the access terminal through an antenna.

FIG. 27 illustrates a procedure for determining the access terminal for receiving the forward channel and the data rate, described with reference to FIG. 28. Referring to FIG. 27, the access network receives the DRC channel transmitted from the access terminal in step 2901, and detects DRC information by demodulating the received DRC channel in step 2903. The access network decides whether to immediately apply the received DRC information to the forward channel in step 2904. If the access network determined to immediately apply the received DRC information to the forward channel, the access network determines the access terminal for receiving the forward channel and the data rate using the received DRC information in step 2907. Otherwise, the access network stores the detected DRC information to use it when making a decision related to the forward channel later, in step 2905. After determining the access terminal for receiving the forward channel and the data rate, the access network transmits data to the determined access terminal at the determined data rate in step 2909.

For a better understanding of the invention, reference will be made separately to a transmission operation and a reception operation of the access terminal.

The access terminal determines a forward data rate by measuring strength of the forward pilot channel, creates DRC information including the determined data rate and then transmits the created DRC information to the access network. Based on the DRC repetition frequency DRCLength (=1, 2 or 4) and the slotted DRC transmission mode DRCSlotMode (=enabled or disabled) previously specified by the access network, the access terminal transmits new DRC information at every slot (DRCLength=1); creates DRC information at every two slots and transmits the created DRC information at one of the 2 slots (DRCLength=2); or creates the DRC information at every 4 slots and transmits the created DRC information at one of the 4 slots (DRCLength=4). That is, for DRCLength=1, the access terminal newly measures the reception power of the pilot channel at every slot, determines the forward data rate, and then transmits the corresponding DRC information to the access network; for DRCLength=2, the access terminal newly measures the reception power of the pilot channel at every 2 slots, determines the forward data rate, and then transmits the corresponding DRC information to the access network; and for DRCLength=4, the access terminal newly measures the reception power of the pilot channel at every 4 slots, determines the forward data rate, and then transmits the corresponding DRC information to the access network.

After transmitting the DRC information to the access network, the access terminal must repeatedly determine for a predetermined time period whether the access network transmits forward data at the data rate specified in the transmitted DRC information. The predetermined time period is variable depending on how long the access network will use the received DRC information when selecting the access terminal to which the forward data is to be transmitted. If the access network has previously informed the access terminal of the time interval where it uses the DRC information in selecting the forward data rate and the access terminal, using the signaling message, the access terminal is not required to determine whether the forward data corresponding to the transmitted DRC information is received, at every slot until before transmission of the next DRC information. That is, since the access terminal knows how long the access network efficiently uses the transmitted DRC information, the access terminal can stop receiving the forward data using the signaling information from the access network. If the access network has not informed the access terminal of the time interval where it uses the DRC information, the access terminal must check the forward data channel at every slot until generating the next DRC information after reporting the DRC information to the access network.

FIG. 28 illustrates the valid time intervals where the access terminal receives the forward traffic channel in response to the transmitted DRC information. In the first case, the valid time interval becomes one slot after the DRC information is transmitted. Therefore, the access terminal determines whether the forward traffic data is received, only for one-slot period after transmitting the DRC information, and stops the receiving operation if it fails to receive the forward traffic in this period. After transmitting the DRC information in the next DRC transmission period, the access terminal repeats the following process.

FIG. 29 illustrates a procedure for transmitting the DRC information and detecting forward traffic in the access terminal according to an embodiment of the present invention. Referring to FIG. 29, the access terminal measures reception power of the forward pilot channel in step 3001. Thereafter, the access terminal determines a forward data rate based on the measured reception power of the pilot channel in step 3003 and creates DRC information corresponding to the determined data rate in step 3005. Subsequently, the access terminal transmits the created DRC information to the access network over the reverse DRC channel in step 3007. After transmitting the DRC information, the access terminal determines in step 3009 whether forward traffic data is received from the access network. If the forward traffic data is received at the requested data rate, the access terminal receives the forward traffic data in step 3015. However, upon failure to receive the forward traffic data, the access terminal determines in step 3011 whether the valid interval of the DRC information has expired. If the valid interval of the DRC information has not expired in the access network, the access terminal returns to step 3009 to determine whether the forward data is received at the next slot. However, if the valid DRC information interval has expired in the access network, the access terminal determines in step 3013 whether the time elapsed after transmission of the DRC information is longer than the DRC transmission period DRCLength. In this process, the access terminal can either repeat or stop reception of the forward channel. If the time elapsed is longer than the transmission period, the access terminal returns to step 3001, to measure the reception power of the forward pilot channel again and then perform the succeeding steps. It is assumed herein that the access network reports the valid DRC information interval to the access terminal through the signaling message. If the valid interval information is not provided to the access terminal, the step 3011 must be canceled.

To sum up, in the slotted DRC transmission mode and the repeated DRC transmission mode, when the capacity of the reverse link is saturated due to DRC interference between the users, the access terminals gate transmission of the DRC channels at predetermined periods, or repeatedly transmits the same DRC channels at the reduced transmission power, thereby contributing to a reduction in interference between users and an increase in capacity of the reverse link.

As described above, the slotted DRC transmission method and the repeated DRC transmission method according to the present invention can resolve the capacity reduction problem of the reverse link, which may happen in the HDR system. In the invention, if the capacity of the reverse link is saturated, the access terminal switches to the slotted DRC transmission mode or the repeated DRC transmission mode. The slotted DRC transmission mode can contribute to a reduction in interference between the users and an increase in capacity of the reverse link, and the repeated DRC transmission mode can also contribute to a reduction in interference due to the DRC channels in the reverse link, thus increasing the capacity of the reverse link.

In the above-stated embodiments, the access terminal measures forward channel environment (pilot channel) and on the basis of which, reversly transmits the maximum forward DRC information which the access terminal may receive. However, the access terminal may transmit the receipt signal measurement value of forward pilot signal, that is, pilot signal C/I. The invention can also be applied to another case where the access terminal transmits pilot signal C/I. In this case, the access terminal transmits the value measuring receipt strength of forward pilot signal according to information which can analogize a C/I update period (corresponding to DRC_Length) or other slot rate instructed from the controller.

While the invention has been shown and described with reference to a certain preferred embodiment thereof, it will be understood by those skilled in the art that various changes in form and details may be made therein without departing from the spirit and scope of the invention as defined by the appended claims.

What is claimed is:
1. An access terminal apparatus in a high data rate mobile communication system, comprising:
 a Data Rate Control (DRC) channel transmitter for creating a DRC channel signal by channel-spreading DRC information indicating one of forward data rates; and
 a controller for determining a slotting rate of a DRC channel by using a signaling message from an access network, and controlling a gating device such that the DRC channel is slotted at every predetermined number of slots according to the determined slotting rate;
 said gating device, under the control of the controller, slotting the created DRC channel signal,
 wherein the signaling message includes slotting rate information and information on a slot where transmitting the DRC channel is started.

2. The access terminal apparatus as claimed in claim 1, further comprising a pilot channel transmitter for creating a pilot channel signal.

3. The access terminal apparatus as claimed in claim 2, wherein the DRC channel signal from the DRC channel transmitter and the pilot channel signal from the pilot channel transmitter are subjected to time division multiplexing.

4. The access terminal apparatus as claimed in claim 2, wherein the DRC channel signal from the DRC channel transmitter and the pilot channel signal from the pilot channel transmitter are subjected to code division multiplexing.

5. The access terminal apparatus as claimed in claim 1, wherein the signaling message further comprises MAC ID information.

6. An access terminal apparatus in a high data rate mobile communication system, comprising:
 a controller for determining a repetition frequency of a Data Rate Control (DRC) channel and transmission power of the DRC channel by using a signaling message from an access network;
 a DRC channel transmitter for repeating a DRC channel signal indicating one of forward data rates as many times as the repetition frequency, under the control of the controller; and
 a gain controller, under the control of the controller, for adjusting transmission power of the DRC channel signal from the DRC channel transmitter below transmission power of a pilot channel,
 wherein the signaling message includes a DRC repetition frequency and transmission power information.

7. The access terminal apparatus as claimed in claim 6, wherein the transmission power information of the DRC channel is transmitted as a value obtained by multiplying a transmission power of the pilot channel by a reciprocal of the DRC channel repetition frequency.

8. A data transmission method for an access network in a high data rate mobile communication system, comprising the steps of:
 measuring reception power of a reverse Data Rate Control (DRCI channel;
 determining a slotting rate of the reverse DRC channel by comparing the measured reception power of the reverse DRC channel with a plurality of predetermined threshold values; and
 transmitting a signaling message including information indicating the determined slotting rate to an access terminal, information on a slot where transmitting the reverse DRC channel is started, and information on whether an offset is applied to a pilot channel.

9. The data transmission method as claimed in claim 8, wherein the reception power of the reverse DRC channel is defined as an average signal-to-noise ratio determined by measuring a signal-to-noise ratio of each reverse DRC channel received from every user, summing the measured signal-to-noise ratios, and then dividing the sum of the measured signal-to-noise ratios by a number of the users.

10. The data transmission method as claimed in claim 8, wherein the reception power of the reverse DRC channel is defined as a least value of a plurality of signal-to-noise ratios measured for reverse DRC channels received from every user.

11. A data transmission method for an access network in a high data rate mobile communication system, comprising the steps of:
- measuring reception power of a reverse Data Rate Control (DRC) channel;
- determining a repetition frequency DRC Length of said reverse DRC channel by comparing the measured reception power of the reverse DRC channel with a plurality of predetermined threshold values;
- adjusting transmission power of the reverse DRC channel below transmission power of a reverse pilot channel according to the determined repetition frequency; and
- transmitting a signaling message including information indicating the repetition frequency and information indicating the transmission power of the reverse DRC channel.

12. The data transmission method as claimed in claim 11, wherein the signaling message further comprises information indicating whether the reverse DRC channel is slotted.

13. The data transmission method as claimed in claim 11, wherein the transmission power of the reverse DRC channel is transmitted as a value obtained by multiplying a transmission power of the pilot channel by a reciprocal of the DRC channel repetition frequency.

14. A data transmission method for an access terminal in a high data rate mobile communication system, comprising the steps of:
- acquiring a repetition frequency of a DRC channel by using a signaling message from an access network;
- adjusting transmission power of the DRC channel signal below transmission power of a pilot channel according to the acquired repetition frequency; and
- repeatedly transmitting the DRC channel as many times as the repetition frequency at the determined transmission power,
- wherein the signaling message includes the repetition frequency.

15. The data transmission method as claimed in claim 14, further comprising the steps of:
- determining a slotting rate by inverting the repetition frequency; and
- slotting at least one of the repeated DRC channels according to the determined slotting rate.

16. A communication method in a high data rate mobile communication system, comprising the steps of:
- during call setup, transmitting a signaling message including a repetition frequency of a reverse DRC channel and information indicating whether an offset is applied to a pilot channel, from an access network to an access terminal;
- repeatedly transmitting the reverse DRC channel requesting one of several forward data rates from the access terminal to the access network as many times as the repetition frequency, if the access terminal determines that a slotted transmission mode is disabled, by using the signaling message;
- determining a slotting rate by inverting the repetition frequency, if the access terminal determines that the slotted transmission mode is enabled or upon receipt of a slotted transmission order message from the access network; and
- slotting the reverse DRC channel at a predetermined number of slots according to the determined slotting rate.

17. The communication method as claimed in claim 16, wherein when the reverse DRC channel is repeatedly transmitted, transmission power of the reverse DRC channel is adjusted below transmission power of a pilot channel.

18. A data transmission method for an access terminal in a high data rate mobile communication system, comprising the steps of:
- creating a DRC channel signal by channel-spreading DRC information indicating one of a plurality of forward data rates;
- determining a slotting rate of the DRC channel by using a signaling message from an access network; and
- slotting and transmitting the DRC channel at every slot according to the determined slotting rate,
- wherein the signaling message includes slotting rate information and information on a slot where transmitting the DRC channel is started.

* * * * *